(12) United States Patent
Marinakis et al.

(10) Patent No.: US 12,259,720 B2
(45) Date of Patent: Mar. 25, 2025

(54) METHOD AND SUPERVISORY SYSTEM FOR MONITORING PERFORMANCE OF A DECISION-MAKING LOGIC OF A CONTROLLER

(71) Applicant: Hitachi Energy Ltd, Zürich (CH)

(72) Inventors: Adamantios Marinakis, Fislisbach (CH); Yaman Cansin Evrenosoglu, Baden (CH); Ioannis Lymperopoulos, Dietikon (CH)

(73) Assignee: Hitachi Energy Ltd, Zürich (CH)

( * ) Notice: Subject to any disclaimer, the term of this patent is extended or adjusted under 35 U.S.C. 154(b) by 167 days.

(21) Appl. No.: 17/401,146

(22) Filed: Aug. 12, 2021

(65) Prior Publication Data
US 2022/0057790 A1     Feb. 24, 2022

(30) Foreign Application Priority Data

Aug. 19, 2020  (EP) .................................. 20191652

(51) Int. Cl.
*G05B 23/02*     (2006.01)

(52) U.S. Cl.
CPC ................................ *G05B 23/0243* (2013.01)

(58) Field of Classification Search
None
See application file for complete search history.

(56) References Cited

U.S. PATENT DOCUMENTS

| 8,014,880 B2 | 9/2011 | Samardgija et al. |
| 2005/0033481 A1 | 2/2005 | Budhraja |
| 2008/0077368 A1 | 3/2008 | Nasle |
| 2008/0082194 A1 | 4/2008 | Samardzija et al. |
| 2010/0100250 A1 | 4/2010 | Budhraja et al. |
| 2019/0288508 A1 | 9/2019 | Froehner et al. |

FOREIGN PATENT DOCUMENTS

| CN | 111523785 A | 8/2020 |
| EP | 2044498 B1 | 12/2011 |
| EP | 2041637 B1 | 3/2013 |
| EP | 2033060 B1 | 4/2013 |

(Continued)

OTHER PUBLICATIONS

Castaño, Fernando, et al. "Self-tuning method for increased obstacle detection reliability based on internet of things LiDAR sensor models." Sensors 18.5 (2018): 1508. (Year: 2018).*

(Continued)

*Primary Examiner* — Carlos R Ortiz Rodriguez
(74) *Attorney, Agent, or Firm* — Procopio, Cory, Hargreaves & Savitch LLP

(57) ABSTRACT

Performance of a decision-making logic of a controller of an industrial automation control system is monitored during field operation of the controller. A supervisory system receives operational data collected during field operation of the controller. The supervisory system performs an analysis of the operational data to assess performance of the decision-making logic, using pre-operational data generated prior to field operation of the controller and/or a performance assessment logic generated prior to field operation of the controller. The supervisory system generates an analysis output based on a result of the analysis.

19 Claims, 15 Drawing Sheets

(56) References Cited

FOREIGN PATENT DOCUMENTS

| | | |
|---|---|---|
| JP | 2010-506258 A | 2/2010 |
| JP | 2021-507418 A | 2/2021 |
| JP | 2021-536055 A | 12/2021 |
| WO | 2008/011563 A2 | 1/2008 |
| WO | 2019/126535 A1 | 6/2019 |
| WO | 2020/037608 A1 | 2/2020 |

OTHER PUBLICATIONS

Niknam, T., A. Kavousifard, and J. Aghaei. "Scenario-based multiobjective distribution feeder reconfiguration considering wind power using adaptive modified particle swarm optimisation." IET Renewable Power Generation 6.4 (2012): 236-247. (Year: 2012).*

* cited by examiner

METHOD AND SUPERVISORY SYSTEM FOR MONITORING PERFORMANCE OF A DECISION-MAKING LOGIC OF A CONTROLLER

FIELD OF THE INVENTION

The invention relates to methods, devices, and systems for monitoring performance of a decision-making logic of a controller of an industrial automation control system (IACS), in particular a power distribution system, power transmission, or power generation system. More specifically, the invention relates to techniques that allows a decision-making logic to be assessed during field operation of the controller.

BACKGROUND OF THE INVENTION

Modern industrial automation control systems (IACS), such as power generation systems or power transmission systems, power grids, or substations, and modern industrial systems include a vast number of components. The decision-making logic of protection devices such as protection relays of such systems decides which one of various actions is to be taken under which circumstances.

For illustration, in real-time operation of an electric power utility, transmission and distribution system equipment, including transformers, overhead lines, underground cables, series/shunt elements etc. are protected by means of a measurement system (voltages, currents), digital relay, and a circuit breaker. The control logic which is deployed in a digital relay utilizes the measured signals, identifies whether there is a severe fault which should be cleared to avoid damage to system equipment and finally sends a signal to the circuit breaker to open. Fast identification and clearance of faults are essential for the reliability and the security of the overall system.

The decision-making logic for each relay (i.e., a protection logic) as well as the coordination scheme between multiple relays are designed and tested under anticipated grid scenarios. Conventionally, this is done by human expert engineers. During the design phase, engineers perform simulations of faults and other disturbances such as switching events in a grid to evaluate and refine the performance of the protection control-logic. The performance metrics are usually set by the prevailing practices for a given grid. Once deployed, the protection logic remains unchanged, until errors in its performance are observed.

Due to proliferation of converter-interfaced generation which introduces more stochasticity to the electricity supply temporally and spatially replacing the conventional generators, and e-mobility which introduces more stochasticity to demand, designing of protection systems are increasingly complex. In addition, due to the lack of short circuit current capacities and different nature of short circuit currents (e.g. delayed zero crossings, distorted signals etc.) provided by the converter-interfaced generators as well as the multi-directional currents due to changing spatial patterns of generation, it is desirable for the protection systems to adjust to changing environments.

As a result, the development of protection logic becomes an increasingly complex task. Furthermore, this task will need to be performed increasingly often as the suitability of the protection system will require to be reevaluated more frequently due to changes in grid infrastructure as well as generation/demand patterns.

A conventional practice for protection logic design is such that, for each specific design case, an expert engineer selects among a plurality of protection functions (such as overcurrent, directional, distance, differential protection) or a combination of them and determines the settings (i.e. function parameters) associated with the selected function(s). Operation of increasingly complex transmission and/or distribution systems closer to their limits is a task requiring combination of outcomes of different functions. The task is exacerbated by the interaction of plural controllers that may be concurrently deployed in the field.

In order to assist the expert engineers in the highly complex task of setting up the decision-making logic, computer-based techniques may be used.

Not only the generation, but also the monitoring of a decision-making logic during field operation is a complex task. This applies in particular in cases in which the decision-making logic is generated not (only) by an expert engineer, but the generation of the decision-making logic is done in a computer-implemented manner, e.g. based on machine learning (ML) techniques. For illustration, when ML is used to generate the decision-making logic, it may become challenging for human experts to evaluate the performance of a decision-making logic during field operation of a controller.

Typical ML systems are powerful in their ability to learn a wide range of functions, but they frequently behave as black box towards the human engineer. This may have various shortcomings. For illustration, it is normally not possible to understand for a human engineer how a decision-making logic obtained by training a decision-making ML model maps input signals to the various possible control actions. This imposes challenging tasks on the human engineer when the decision-making logic may need to be revised in response to a change in power system topology or other updates to a power system.

SUMMARY

There is a need to provide improved techniques for monitoring performance of a decision-making logic that is executed by a controller of an industrial automation control system, IACS, in particular a power distribution system, a power transmission system, or power generation system. There is in particular a need for improved techniques that allow the decision-making logic to be automatically monitored and evaluated during field operation of the controller. There is a need for improved techniques that allow the decision-making logic to be automatically monitored and evaluated, even when the internal operation of the decision-making logic is not explicitly known, e.g., when the decision-making logic has been created using machine learning (ML) techniques.

According to embodiments of the invention, methods and system are provided that implement a supervisory system which autonomously assesses, in an ongoing fashion during field operation of a controller, whether a decision-making logic (e.g., a control logic) performs in accordance with quality criteria.

The supervisory system may be operative to determine whether the decision-making logic needs to be updated.

The supervisory system may be operative to autonomously evaluate a performance and/or suitability of the decision-making logic in a changing environment.

Output generated by the supervisory system may be output via a human machine interface (HMI) and/or may be fed-back into a system that automatically generated a decision-making logic for controllers of an IACS.

The supervisory system for performing an assessment of the decision-making logic can be an integral part of the control system, or it can be resident in an external system, e.g. as part of a cloud service.

The supervisory system may monitor controller actions as well as the environment, may be operative to assess the performance of the controller with respect to a (set of) performance metric(s), may be operative to identify changes in the environment and assess whether the decision-making logic meets the objectives which it was originally designed for. The supervisory system may automatically notify an operator about the need to re-design or update the decision-making logic, optionally providing insight and directions on the root-causes of this need for an update, and/or may automatically trigger a modification of a computer-implemented design process for the decision-making logic.

According to an embodiment, a method of monitoring performance of a decision-making logic of a controller of an industrial automation control system (IACS), in particular of a controller of an electric power system, during field operation of the controller. The method may comprise receiving operational data collected during field operation of the controller. The method may comprise performing an analysis of the operational data to assess performance of the decision-making logic, using pre-operational data generated prior to field operation of the controller and/or a performance assessment logic, the performance assessment logic being generated prior to field operation of the controller and/or being generated using data generated in a computer-implemented process of creating the decision-making logic. The method may comprise generating an analysis output based on a result of the analysis.

The method may be automatically performed by a supervisory system.

The operational data may comprise information on decision outputs of the decision-making logic during field operation of the controller.

Performing the analysis may comprise computing one or several key performance indicators (KPIs) from the decision outputs in accordance with at least one metric.

The at least one metric may be dependent on a user input.

The method may further comprise receiving the user input specifying the at least one metric at a user interface.

The operational data may further comprise electric power system data that affects operation of the controller.

The electric power system data may comprise at least one, several, or all of the following: data at a bus to which the controller may be connected, data from a bus different from the bus to which the controller may be connected, data from system-wide measurements, data from an energy management system (EMS), data from a distribution management system (DMS).

The analysis may be performed using the pre-operational data.

The method further may comprise retrieving the pre-operational data from a database during field operation of the controller.

The pre-operational data may comprise at least one, several, or all of the following: models used to perform simulations when generating the decision-making logic; scenarios, test cases, and/or events that were simulated when generating the decision-making logic; performance of the decision-making logic in simulations performed when generating the decision-making logic.

Performing the analysis may comprise evaluating an accuracy of the models used to perform simulations when generating the decision-making logic.

Evaluating an accuracy of the models used to perform simulations when generating the decision-making logic may include model validation, calibration and/or identification during field operation of the controller and/or comparing signals observed during field operation of the controller with signals expected according to the models used to perform simulations when generating the decision-making logic.

Alternatively or additionally, performing the analysis may comprise evaluating the scenarios, test cases, and/or events that were simulated when generating the decision-making logic.

Evaluating the scenarios, test cases, and/or events that were simulated when generating the decision-making logic may comprise comparing operating points observed during field operation of the controller with operating points resulting from the scenarios, test cases, and/or events that were simulated when generating the decision-making logic.

Alternatively or additionally, performing the analysis may comprise comparing control actions taken by the controller during field operation and control actions simulated when generating the decision-making logic.

Comparing control actions taken by the controller during field operation and control actions simulated when generating the decision-making logic may comprise creating a dataset including system operating conditions and control actions taken by the controller during field operation of the controller and comparing the dataset to the pre-operational data including system operating conditions and resultant control actions simulated when generating the decision-making logic.

Alternatively or additionally, performing the analysis may comprise comparing a value of at least one, several, or all KPIs for decision outputs taken by the controller during field operation and a value of the at least one, several, or all KPIs stored in the pre-operational data.

Information on one or following of models used to perform simulations when generating the decision-making logic, scenarios, test cases, and/or events that were simulated when generating the decision-making logic, control actions simulated when generating the decision-making logic, KPIs may be retrieved by the supervisory system from a database, during field operation of the controller.

Information on one or following of models used to perform simulations when generating the decision-making logic, scenarios, test cases, and/or events that were simulated when generating the decision-making logic, control actions simulated when generating the decision-making logic, KPIs may be retrieved and processed not only for the decision-making logic used in field operation, but also for one or several alternative decision-making logics considered in a decision-making logic creation process.

The decision-making logic used in field operation and the one or several alternative decision-making logics considered in the decision-making logic creation process may be decision-making logic ML models, in particular artificial neural networks (ANNs). The decision-making logic used in field operation and the one or several alternative decision-making logics considered in the decision-making logic creation process may be distinguished in decision-making logic ML model topology (e.g., in the number of layers) and/or in parameters (such as weights of links of forward functions of the ANN).

Alternatively or additionally, the supervisory system may perform the analysis using the performance assessment logic.

The performance assessment logic may be operative to perform the analysis, without having to access, during the field operation of the controller, a database that includes information on the generation of the decision-making logic.

The performance assessment logic may operate autonomously during field operation of the controller.

The performance assessment logic may perform a classification task.

The performance assessment logic may receive the operational data as input and may generate an analysis output having plural discrete values.

The plural discrete values may include values indicating whether the decision-making logic is deemed to operate in accordance with a performance metric-based criterion or not.

The plural discrete values may include at least one value indicating that the decision-making logic is deemed to operate in accordance with a performance metric-based criterion, but is approaching a non-acceptable operation regime.

The performance assessment logic may receive inputs that may include voltage, current, phasor and/or quadrature measurements.

Alternatively or additionally, the performance assessment logic may receive inputs that may include a power system topology.

Alternatively or additionally, the performance assessment logic may receive inputs that may include weather information.

Alternatively or additionally, the performance assessment logic may receive inputs that may include electricity prices.

The performance assessment logic may generate an output that may be a flag indicating a suitability of the decision-making logic.

Alternatively or additionally, the performance assessment logic may generate an output that may include a forecast time information indicating when the decision-making logic may need to be revised or otherwise revisited.

Alternatively or additionally, the performance assessment logic may generate an output that may include information on possible root-causes for poor performance of the decision-making logic.

Alternatively or additionally, the performance assessment logic may generate an output that may include information on a root-cause resolution, which may indicate how the decision-making logic can be improved.

The information on possible root-causes for poor performance and/or the information on a root-cause resolution may include a scenario parameter, in particular a scenario signature (i.e., a parameter or combination of parameters that is input to the decision-making logic).

The performance assessment logic may be a performance-assessment ML model.

The performance assessment logic may be an artificial neural network.

The performance-assessment ML model implementing the performance assessment logic may be trained using data generated during generation of the decision-making logic.

The performance-assessment ML model implementing the performance assessment logic may be trained prior to field operation of the controller and after the decision-making logic has been generated.

The method may comprise training the machine learning model with a second set of scenarios.

The second set of scenarios may include scenarios that may be outside of an operation specification of the controller.

The second set of scenarios may be different from a first set of scenarios used to train the decision-making logic.

The method may further comprise generating at least a sub-set of the second set of scenarios with a further scenario-generating ML model that challenges the decision-making logic.

The first set of scenarios and/or the second set of scenarios may be generated using a scenario-creating logic.

The first set of scenarios and/or the second set of scenarios may be generated by a further machine-learning model. The first set of scenarios and/or the second set of scenarios may be generated using a generative adversarial network.

The method may further comprise monitoring or predicting a time-dependent evolution of results of the analysis and generating the analysis output based on the time-dependent evolution.

Predicting the time-dependent evolution may comprise predicting future operating points and predicting decision outputs of the decision-making logic for the predicted future operating points.

An alarm, warning, or other analysis output may be automatically generated if the time-dependent evolution is indicative of a future controller performance that does not meet a performance metric-based criterion.

Predicting a time-dependent future evolution of a performance of the decision-making logic may be performed using the supervisory system.

In order to allow the performance assessment logic to perform the prediction, the method may comprise training the performance assessment logic using batches of scenarios, each batch representing a time-series.

The method may comprise a computer-implemented generation of the batches of scenarios, with the evolution being driven by a latent variable or several latent variables.

The latent variable(s) may be associated with actual variables defining a scenario in a deterministic manner.

The latent variable(s) may be associated with actual variables defining a scenario in a stochastic manner.

In order to allow the performance assessment logic to perform the prediction, the supervisory system may alternatively or additionally execute at least one predictor, wherein an output of the predictor is supplied as input to the performance-assessment logic.

The supervisory system may execute plural predictors and plural instances of the performance-assessment logic, each of the plural predictors generating an input for the performance-assessment logic.

The predictor(s) may receive the operational data as inputs and may generate predictions for future operation points, based on, e.g., historical data.

When plural predictor(s) are deployed, the plural predictor(s) may generate predictions for plural different points in time and/or for plural different ambient conditions.

The predictor(s) may be recurrent neural networks.

The method may further comprise controlling a human machine interface, HMI, to output the analysis output, wherein the analysis output includes information on a past, current, and/or predicted future performance of the controller during field operation.

A method of operating a power system asset of a power system may comprise executing, by at least one integrated circuit of a controller, a decision-making logic during field operation of the controller, including generating and outputting decision outputs to control the power system asset.

The method may further comprise executing, by the at least one integrated circuit of the controller or by at least one, several, or all further integrated circuit, the method of any one of the preceding claims for monitoring the decision-making logic of the controller during field operation of the controller.

The method may further comprise outputting the analysis output via a human machine interface, HMI, and/or automatically performing a control action based on the analysis output.

The control action may trigger a re-generation or update of the decision-making logic The method may further comprise performing a root-cause identification for poor performance of the decision-making logic during field operation and/or providing an indication for improving the decision-making logic during field operation.

The method may further comprise performing a root-cause resolution. The root-cause resolution may include identifying which scenario parameter(s) of the real-life operation scenario needs to be modified to cause the decision-making logic to meet a performance metric-based criterion.

The root-cause resolution may comprise identifying, by the supervisory system, a shift in a scenario parameter space that causes the performance of the decision-making logic to fulfill a performance-metric based criterion.

Identifying the shift in the scenario parameter space may comprise performing a constrained optimization.

The constrained optimization may use an objective function that is a norm of the shift.

The constrained optimization may use the performance assessment logic to determine whether the constraint is met.

Performing the analysis may comprise identifying, by the supervisory system, a performance of the decision-making logic that is insufficient due to factors exogeneous of a power system, such as spatial and/or temporal demand profile and/or weather conditions.

Alternatively or additionally, performing the analysis may comprise identifying, by the supervisory system, a performance of the decision-making logic that is insufficient due to changes in power system infrastructure, such as new transmission and/or distribution lines, new generation or storage capacity, installation of new controllers, topological changes during ongoing operation, which may be caused by switching.

Alternatively or additionally, performing the analysis may comprise identifying, by the supervisory system, a performance of the decision-making logic that is insufficient due to changes in another decision-making logic executed by another controller of the power system.

Alternatively or additionally, performing the analysis may comprise identifying, by the supervisory system, a performance of the decision-making logic that is insufficient due to a change in a performance metric.

The decision-making logic may generate the decision output by processing controller inputs, the controller inputs including one, several or all of locally available measurements, remotely captured measurements, system-wide observations.

The controller may be a controller of a distributed energy resource (DER).

The controller may be a local controller.

The local controller may be selected from a group consisting of: a protection relay, a control systems of a generator (e.g. a governor and exciter/automatic voltage regulator), a control system of high-voltage, direct current (HVDC) device(s), a control system of flexible alternating current transmission system (FACTS) device(s), a decision logic of switched capacitors and/or reactors, an under-frequency shedding relay, and under-voltage load shedding relay.

The controller may be a central controller.

The central controller may be selected from a group consisting of: an EMS/DMS, e.g., decision-making logic for secondary frequency control, decision-making logic for generation re-dispatch, decision-making logic for utilization of demand flexibility, decision-making logic for reclosing operations, decision-making logic for secondary voltage control by means of reactive power redispatch, decision-making logic coordinating actions across the grid such as in the case of system protection schemes or remedial action schemes which typically need to be activated following a disturbance.

The controller may control a controllable parameter, which may be selected from the group consisting of: active (P) and reactive (Q) power injections of one or several generators and/or energy storage systems; P/Q injections of DC links or back-to-back DC; Q injections of FACTS devices such as SVC or STATCOM; power flow control devices; a tap position of one or several capacitors banks, reactors and OLTCs; demand; P/Q injections by e-fleets; status of switches and/or reclosers.

A supervisory system for a decision-making logic of a controller of an industrial automation control system, IACS, in particular of a controller of an electric power system, during field operation of the controller, comprises at least one integrated circuit operative to receive operational data collected during field operation of the. The at least one integrated circuit may be operative to perform an analysis of the operational data to assess performance of the decision-making logic, using pre-operational data generated prior to field operation of the controller and/or a performance assessment logic, the performance assessment logic being generated prior to field operation of the controller and/or being generated using data generated in a computer-implemented process of creating the decision-making logic. The at least one integrated circuit may be operative to generate an analysis output based on a result of the analysis.

The supervisory system may be operative such that the operational data may comprise information on decision outputs of the decision-making logic during field operation of the controller.

The supervisory system may be operative such that performing the analysis may comprise computing one or several key performance indicators (KPIs) from the decision outputs in accordance with at least one metric.

The supervisory system may be operative such that the at least one metric may be dependent on a user input.

The supervisory system may be operative for receiving the user input specifying the at least one metric at a user interface.

The supervisory system may be operative such that the operational data may further comprise electric power system data that affects operation of the controller.

The supervisory system may be operative such that the electric power system data may comprise at least one, several, or all of the following: data at a bus to which the controller may be connected, data from a bus different from the bus to which the controller may be connected, data from system-wide measurements, data from an energy management system (EMS), data from a distribution management system (DMS).

The supervisory system may be operative such that the analysis may be performed using the pre-operational data.

The supervisory system may be operative for retrieving the pre-operational data from a database during field operation of the controller.

The supervisory system may be operative such that the pre-operational data may comprise at least one, several, or all of the following: models used to perform simulations when generating the decision-making logic; scenarios, test cases, and/or events that were simulated when generating the decision-making logic; performance of the decision-making logic in simulations performed when generating the decision-making logic.

The supervisory system may be operative such that performing the analysis may comprise evaluating an accuracy of the models used to perform simulations when generating the decision-making logic.

The supervisory system may be operative such that evaluating an accuracy of the models used to perform simulations when generating the decision-making logic may include model validation, calibration and/or identification during field operation of the controller and/or comparing signals observed during field operation of the controller with signals expected according to the models used to perform simulations when generating the decision-making logic.

Alternatively or additionally, the supervisory system may be operative such that performing the analysis may comprise evaluating the scenarios, test cases, and/or events that were simulated when generating the decision-making logic.

The supervisory system may be operative such that evaluating the scenarios, test cases, and/or events that were simulated when generating the decision-making logic may comprise comparing operating points observed during field operation of the controller with operating points resulting from the scenarios, test cases, and/or events that were simulated when generating the decision-making logic.

Alternatively or additionally, the supervisory system may be operative such that performing the analysis may comprise comparing control actions taken by the controller during field operation and control actions simulated when generating the decision-making logic.

The supervisory system may be operative such that comparing control actions taken by the controller during field operation and control actions simulated when generating the decision-making logic may comprise creating a dataset including system operating conditions and control actions taken by the controller during field operation of the controller and comparing the dataset to the pre-operational data including system operating conditions and resultant control actions simulated when generating the decision-making logic.

Alternatively or additionally, the supervisory system may be operative such that performing the analysis may comprise comparing a value of at least one, several, or all KPIs for decision outputs taken by the controller during field operation and a value of the at least one, several, or all KPIs stored in the pre-operational data.

The supervisory system may be operative to receive information on one or following of models used to perform simulations when generating the decision-making logic, scenarios, test cases, and/or events that were simulated when generating the decision-making logic, control actions simulated when generating the decision-making logic, KPIs from a database, during field operation of the controller.

The supervisory system may be operative to retrieve and process information on one or following of models used to perform simulations when generating the decision-making logic, scenarios, test cases, and/or events that were simulated when generating the decision-making logic, control actions simulated when generating the decision-making logic, KPIs not only for the decision-making logic used in field operation, but also for one or several alternative decision-making logics considered in a decision-making logic creation process.

The decision-making logic used in field operation and the one or several alternative decision-making logics considered in the decision-making logic creation process may be decision-making logic ML models, in particular artificial neural networks (ANNs). The decision-making logic used in field operation and the one or several alternative decision-making logics considered in the decision-making logic creation process may be distinguished in decision-making logics ML model topology (e.g., in the number of layers) and/or in parameters (such as weights of links of forward functions of the ANN).

Alternatively or additionally, the supervisory system may operative to perform the analysis using the performance assessment logic.

The performance assessment logic may be operative to perform the analysis, without having to access, during the field operation of the controller, a database that includes information on the generation of the decision-making logic.

The performance assessment logic may operate autonomously during field operation of the controller.

The performance assessment logic may perform a classification task.

The performance assessment logic may receive the operational data as input and may generate an analysis output having plural discrete values.

The performance assessment logic may be operative such that the plural discrete values may include values indicating whether the decision-making logic is deemed to operate in accordance with a performance metric-based criterion or not.

The performance assessment logic may be operative such that the plural discrete values may include at least one value indicating that the decision-making logic is deemed to operate in accordance with a performance metric-based criterion, but is approaching a non-acceptable operation regime.

The performance assessment logic may be operative to receive inputs that may include voltage, current, phasor and/or quadrature measurements.

Alternatively or additionally, the performance assessment logic may be operative to receive inputs that may include a power system topology.

Alternatively or additionally, the performance assessment logic may be operative to receive inputs that may include weather information.

Alternatively or additionally, the performance assessment logic may be operative to receive inputs that may include electricity prices.

The performance assessment logic may be operative to generate an output that may be a flag indicating a suitability of the decision-making logic.

Alternatively or additionally, the performance assessment logic may be operative to generate an output that may include a forecast time information indicating when the decision-making logic may need to be revised or otherwise revisited.

Alternatively or additionally, the performance assessment logic may be operative to generate an output that may include information on a possible root-cause for poor performance of the decision-making logic.

Alternatively or additionally, the performance assessment logic may be operative to generate an output that may include information on a root-cause resolution. The information on the root-cause resolution may indicate how the decision-making logic can be improved.

The performance assessment logic may be operative such that the information on the root-cause resolution may include a scenario parameter, in particular a scenario signature.

The performance assessment logic may be a performance-assessment ML model.

The performance assessment logic may be an artificial neural network.

The performance-assessment ML model implementing the performance assessment logic may be trained using data generated during generation of the decision-making logic.

The performance-assessment ML model implementing the performance assessment logic may be trained prior to field operation of the controller and after the decision-making logic has been generated.

The performance-assessment ML model implementing the performance assessment logic may be trained with a second set of scenarios.

The second set of scenarios may include scenarios that may be outside of an operation specification of the controller.

The second set of scenarios may be different from a first set of scenarios with which the decision-making logic is trained.

The supervisory system may be operative for monitoring or predicting a time-dependent evolution of results of the analysis and generating the analysis output based on the time-dependent evolution.

The supervisory system may be operative such that predicting the time-dependent evolution may comprise predicting future operating points and predicting decision outputs of the decision-making logic for the predicted future operating points.

The supervisory system may be operative such that an alarm, warning, or other analysis output may be automatically generated if the time-dependent evolution is indicative of a future controller performance that does not meet a performance metric-based criterion.

The supervisory system may be operative such that predicting a time-dependent future evolution of a performance of the decision-making logic may be performed using the supervisory system.

The performance assessment logic may be trained using batches of scenarios, each batch representing a time-series.

The batches of scenarios may have an evolution, with the evolution being driven by a latent variable or several latent variables.

The latent variable(s) may be associated with actual variables defining a scenario in a deterministic manner.

The latent variable(s) may be associated with actual variables defining a scenario in a stochastic manner.

The supervisory system may alternatively or additionally be operative to execute at least one predictor, wherein an output of the predictor is supplied as input to the performance-assessment logic.

The supervisory system may be operative to execute plural predictors and plural instances of the performance-assessment logic, each of the plural predictors generating an input for the performance-assessment logic.

The predictor(s) may be operative receive the operational data as inputs and may generate predictions for future operation points, based on, e.g., historical data.

When plural predictor(s) are deployed, the plural predictor(s) may be operative to generate predictions for plural different points in time and/or for plural different ambient conditions.

The predictor(s) may be recurrent neural networks.

The supervisory system may be operative to control a human machine interface, HMI, to output the analysis output, wherein the analysis output includes information on a past, current, and/or predicted future performance of the controller during field operation.

The supervisory system may be operative for generating commands for operating a power system asset of a power system.

The supervisory system may comprise a controller operative to execute a decision-making logic during field operation of the controller, including generating and outputting decision outputs to control the power system asset.

The supervisory system may be operative to output the analysis output via a human machine interface, HMI, based on the analysis output and/or automatically perform a control action based on the analysis output.

The supervisory system may be operative for performing a root-cause identification for poor performance of the decision-making logic during field operation and/or providing an indication for improving the decision-making logic during field operation.

The supervisory system may be operative such for performing a root-cause resolution. The supervisory system may be operative such that the root-cause resolution may comprise identifying which scenario parameter(s) of the real-life operation scenario needs to be modified to cause the decision-making logic to meet a performance-metric based criterion.

The supervisory system may be operative such that the supervisory system is operative to identify a shift in a scenario parameter space that causes the performance of the decision-making logic to fulfill a performance-metric based criterion, to perform the root-cause resolution.

The supervisory system may be operative such that identifying the shift in the scenario parameter space may comprise performing a constrained optimization.

The supervisory system may be operative such that the constrained optimization may use an objective function that is a norm of the shift.

The supervisory system may be operative such that the constrained optimization may use the performance assessment logic to determine whether the constraint is met.

The supervisory system may be operative such that performing the analysis may comprise identifying, by the supervisory system, a performance of the decision-making logic that is insufficient due to factors exogeneous of a power system, such as spatial and/or temporal demand profile and/or weather conditions.

Alternatively or additionally, the supervisory system may be operative such that performing the analysis may comprise identifying, by the supervisory system, a performance of the decision-making logic that is insufficient due to changes in power system infrastructure, such as new transmission and/or distribution lines, new generation or storage capacity, installation of new controllers, topological changes during ongoing operation, which may be caused by switching.

Alternatively or additionally, the supervisory system may be operative such that performing the analysis may comprise identifying, by the supervisory system, a performance of the decision-making logic that is insufficient due to changes in another decision-making logic executed by another controller of the power system.

Alternatively or additionally, the supervisory system may be operative such that performing the analysis may comprise identifying, by the supervisory system, a performance of the decision-making logic that is insufficient due to a change in a performance metric.

According to another aspect of the invention, there is provided a method of monitoring performance of a decision-making logic of a controller of an industrial automation control system, IACS, in particular of a controller of an electric power system, during field operation of the controller, the method being performed by at least one integrated circuit of a supervisory system and comprising:

receiving operational data collected during field operation of the controller;

performing an analysis of the operational data to assess performance of the decision-making logic, wherein the analysis comprises a predictive analysis that identifies a future system operating condition that leads to a performance degradation of the decision-making logic; and generating an analysis output based on at least a result of the predictive analysis.

The operational data may comprise information on decision outputs of the decision-making logic during field operation of the controller.

The predictive analysis may comprise predicting future operating points and predicting decision outputs of the decision-making logic for the predicted future operating points.

The predictive analysis may be performed by a performance assessment logic.

The performance assessment logic may be generated prior to field operation of the controller and/or may be generated using data generated in a computer-implemented process of creating the decision-making logic.

In order to allow the performance assessment logic to perform the prediction, the method may comprise training the performance assessment logic using batches of scenarios, each batch representing a time-series.

The method may comprise a computer-implemented generation of the batches of scenarios, with the evolution being driven by a latent variable or several latent variables.

The latent variable(s) may be associated with actual variables defining a scenario in a deterministic manner.

The latent variable(s) may be associated with actual variables defining a scenario in a stochastic manner.

In order to allow the performance assessment logic to perform the prediction, the supervisory system may alternatively or additionally execute at least one predictor, wherein an output of the predictor is supplied as input to the performance-assessment logic.

The supervisory system may execute plural predictors and plural instances of the performance-assessment logic, each of the plural predictors generating an input for the performance-assessment logic.

The predictor(s) may receive the operational data as inputs and may generate predictions for future operation points, based on, e.g., historical data.

When plural predictor(s) are deployed, the plural predictor(s) may generate predictions for plural different points in time and/or for plural different ambient conditions.

The predictor(s) may be recurrent neural networks.

The method may further comprise controlling a human machine interface, HMI, to output the analysis output, wherein the analysis output includes information on a past, current, and/or predicted future performance of the controller during field operation.

An alarm, warning, or other analysis output may be automatically generated if the time-dependent evolution is indicative of a future controller performance that does not meet a performance metric-based criterion.

According to another aspect of the invention, a supervisory system for a decision-making logic of a controller of an industrial automation control system, IACS, in particular of a controller of an electric power system, during field operation of the controller, is provided, the supervisory system comprising at least one integrated circuit operative to:

receive operational data collected during field operation of the controller;

perform an analysis of the operational data to assess performance of the decision-making logic, wherein the analysis comprises a predictive analysis that identifies a future system operating condition that leads to a performance degradation of the decision-making logic; and generate an analysis output based on at least a result of the predictive analysis.

The supervisory system may be operative such that the operational data may comprise information on decision outputs of the decision-making logic during field operation of the controller.

The supervisory system may be operative such that the predictive analysis may comprise predicting future operating points and predicting decision outputs of the decision-making logic for the predicted future operating points.

The supervisory system may be operative such that the predictive analysis may be performed by a performance assessment logic.

The supervisory system may be operative such that the performance assessment logic is generated prior to field operation of the controller and/or using data generated in a computer-implemented process of creating the decision-making logic.

The performance assessment logic may be trained using batches of scenarios, each batch representing a time-series.

An evolution of the scenarios of a batch may be driven by a latent variable or several latent variables.

The latent variable(s) may be associated with actual variables defining a scenario in a deterministic manner.

The latent variable(s) may be associated with actual variables defining a scenario in a stochastic manner.

The supervisory system may alternatively or additionally be operative to execute at least one predictor, wherein an output of the predictor is supplied as input to the performance-assessment logic.

The supervisory system may be operative to execute plural predictors and plural instances of the performance-assessment logic, each of the plural predictors generating an input for the performance-assessment logic.

The supervisory system may be operative such that the predictor(s) may receive the operational data as inputs and may generate predictions for future operation points, based on, e.g., historical data.

The supervisory system may be operative such that the plural predictor(s) may generate predictions for plural different points in time and/or for plural different ambient conditions.

The predictor(s) may be recurrent neural networks.

The supervisory system may be operative for controlling a human machine interface (HMI) to output the analysis output, wherein the analysis output includes information on a past, current, and/or predicted future performance of the controller during field operation.

The supervisory system may be operative such that an alarm, warning, or other analysis output may be automatically generated if the time-dependent evolution is indicative of a future controller performance that does not meet a performance metric-based criterion.

According to another aspect of the invention, there is provided a method of monitoring performance of a decision-making logic of a controller of an industrial automation control system, IACS, in particular of a controller of an electric power system, during field operation of the controller, the method being performed by at least one integrated circuit of a supervisory system and comprising:

receiving operational data collected during field operation of the controller;

performing an analysis of the operational data to assess performance of the decision-making logic, comprising identifying a possible root-cause for poor performance of the decision-making logic and/or performing a root-cause resolution for improving the decision-making logic during field operation; and generating an analysis output based on a result of the analysis.

The operational data may comprise information on decision outputs of the decision-making logic during field operation of the controller.

The analysis output may include information on the possible root-cause for poor performance of the decision-making logic.

The analysis output may include information on the root-cause resolution.

The supervisory system may execute a performance assessment logic.

Identifying a root-cause for poor performance of the decision-making logic during field operation and/or generating an indication for a root-cause resolution during field operation may comprise identifying which scenario parameter(s) of the real-life operation scenario needs to be modified to cause the decision-making logic to meet a performance metric-based criterion.

Identifying a root-cause for poor performance of the decision-making logic during field operation and/or generating an indication for a root-cause resolution during field operation may comprise identifying, by the supervisory system, a shift in a scenario parameter space that causes the performance of the decision-making logic to fulfill a performance-metric based criterion.

Identifying the shift in the scenario parameter space may comprise performing a constrained optimization.

The constrained optimization may use an objective function that is a norm of the shift.

The constrained optimization may use the performance assessment logic to determine whether the constraint is met.

According to another aspect of the invention, a supervisory system for a decision-making logic of a controller of an industrial automation control system, IACS, in particular of a controller of an electric power system, during field operation of the controller, is provided, the supervisory system comprising at least one integrated circuit operative to:

receive operational data collected during field operation of the controller;

perform an analysis of the operational data to assess performance of the decision-making logic, comprising identifying a possible root-cause for poor performance of the decision-making logic and/or performing a root-cause resolution for improving the decision-making logic during field operation; and generate an analysis output based on a result of the analysis.

The supervisory system may be operative such that the operational data may comprise information on decision outputs of the decision-making logic during field operation of the controller.

The supervisory system may be operative such that the analysis output may include information on the possible root-cause for poor performance of the decision-making logic.

The supervisory system may be operative such that the analysis output may include information on how the decision-making logic can be improved.

The supervisory system may be operative to execute a performance assessment logic.

The supervisory system may be operative such that identifying a root-cause for poor performance of the decision-making logic during field operation and/or performing a root-cause resolution for improving the decision-making logic during field operation may comprise identifying which scenario parameter(s) of the real-life operation scenario needs to be modified to cause the decision-making logic to meet a performance-metric based criterion.

The supervisory system may be operative such that identifying a root-cause for poor performance of the decision-making logic during field operation and/or generating an indication for improving the decision-making logic during field operation may comprise identifying, by the supervisory system, a shift in a scenario parameter space that causes the performance of the decision-making logic to fulfill a performance-metric based criterion.

The supervisory system may be operative such that identifying the shift in the scenario parameter space comprises performing a constrained optimization.

The supervisory system may be operative such that the constrained optimization may use an objective function that is a norm of the shift.

The supervisory system may be operative such that the constrained optimization may use the performance assessment logic to determine whether the constraint is met.

An Industrial Automation Control System, IACS, in particular an electric power system, comprises a controller operative to execute a decision-making logic to decide which control actions must be taken; and the supervisory system according to an embodiment for monitoring the decision-making logic during its operation.

The decision-making logic may be operative to generate the decision output by processing controller inputs, the controller inputs including one, several or all of locally available measurements, remotely captured measurements, system-wide observations.

The controller may be a controller of a distributed energy resource (DER).

The controller may be a local controller.

The local controller may be selected from a group consisting of: a protection relay, a control systems of a generator (e.g. a governor and exciter/automatic voltage regulator), a control system of high-voltage, direct current (HVDC) device(s), a control system of flexible alternating current transmission system (FACTS) device(s), a decision logic of switched capacitors and/or reactors, an under-frequency shedding relay, and under-voltage load shedding relay.

The controller may be a central controller.

The central controller may be selected from a group consisting of: an EMS/DMS, e.g., decision-making logic for secondary frequency control, decision-making logic for generation re-dispatch, decision-making logic for utilization of demand flexibility, decision-making logic for reclosing operations, decision-making logic for secondary voltage control by means of reactive power redispatch, decision-making logic coordinating actions across the grid such as in the case of system protection schemes or remedial action schemes which typically need to be activated following a disturbance.

The controller may control a controllable parameter, which may be selected from the group consisting of: active (P) and reactive (Q) power injections of one or several generators and/or energy storage systems; P/Q injections of DC links or back-to-back DC; Q injections of FACTS devices such as SVC or STATCOM; power flow control devices; a tap position of one or several capacitors banks, reactors and OLTCs; demand; P/Q injections by e-fleets; status of switches and/or reclosers.

Various effects and advantages are attained by the methods, devices, and systems according to embodiments.

The methods, devices, and systems according to the invention allow a decision-making logic that is executed by a controller of an industrial automation control system, IACS, to be monitored during field operation of the controller. The decision-making logic can be automatically monitored and evaluated during field operation of the controller. The methods, devices, and systems can be used even when the internal operation of the decision-making logic is not explicitly known, e.g., when the decision-making logic has been created using machine learning (ML) techniques.

The methods, devices, and systems according to the invention enable the assessment of a validity of the decision-making logic of controllers in various grid devices and operational levels, in an autonomous ongoing manner while in operation (i.e. without interruption of operation).

The methods, devices, and systems according to the invention enable a decision-making logic to stay attuned to a changing grid environment such that its efficiency/validity is not compromised. To this end, the methods, devices, and systems automatically can recognize that the decision-making logic is not adequate any more. Typically, such situations occur because the controller does not anymore operate in an environment which was anticipated in the generation process of the decision-making logic 35.

The methods, devices, and systems according to the invention are applicable to control problems of an individual local or central controller and to the assessment of coordinated control logic which accounts for the interactions between the various decision-making blocks of various power system components.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of a power generation system, a power transmission system, or a power distribution system, the methods and devices described in detail below may be used in a wide variety of system.

The features of embodiments may be combined with each other, unless specifically noted otherwise.

According to embodiments of the invention, a supervisory system is deployed to monitor and assess performance of a decision-making logic of a controller of an Industrial Automation Control System (IACS), such as an electric power system.

While the disclosed techniques are applicable to a wide variety of controllers in industrial or electric power systems, they are described in this application in the context of operation of transmission and distribution grids as well as smart sites or smart cities, without being limited thereto.

As used herein, the term "decision-making logic" broadly encompasses a logic that is executed by a controller. The decision-making logic may be a control logic which generates control outputs, such as control commands, as a result of the execution of the decision-making logic, without being limited thereto. Protection functions in electric power systems (such as power generation or power transmission systems) are examples for such a decision-making logic, without being limited thereto. For illustration, the techniques disclosed herein may be used to generate the decision-making logic of a digital protection relay, without being limited thereto.

As will be explained in detail below, the supervisory system may use information generated or otherwise used in a computer-implemented process of generating the decision-making logic of the controller in a performance assessment that is performed during field operation of the decision-making logic.

The supervisory system enables the assessment of the validity of the decision-making logic of controllers in various industrial devices, such as power system devices, and/or at various operational levels. The performance assessment can be performed autonomously by the supervisory system. The supervisory system may perform the performance assessment continually during field operation of the controller, i.e., without requiring an interruption of electric power system or industrial system operation.

Figure 1:
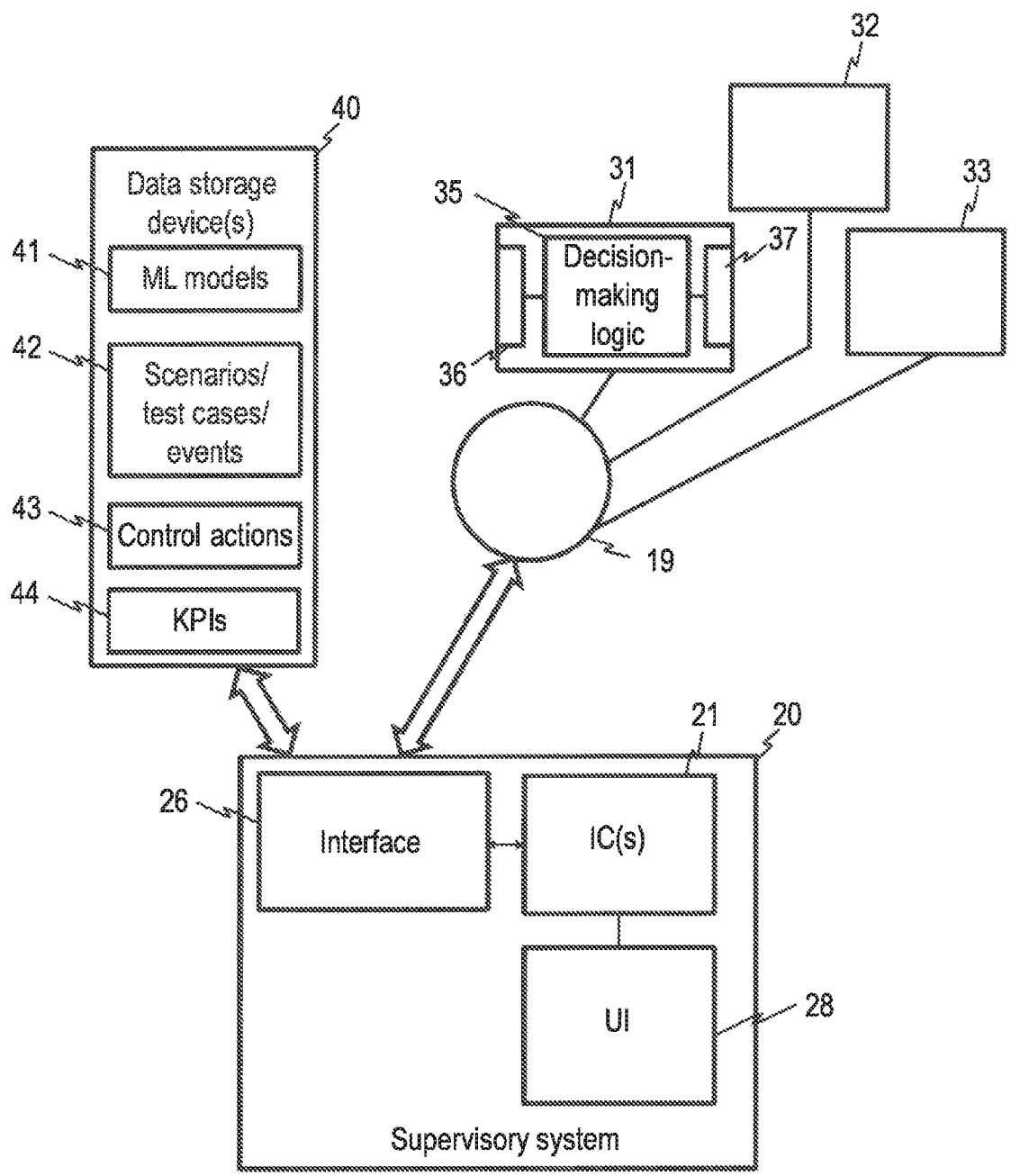
FIG. 1 is a schematic representation of a system comprising a supervisory system.
Figure 2:
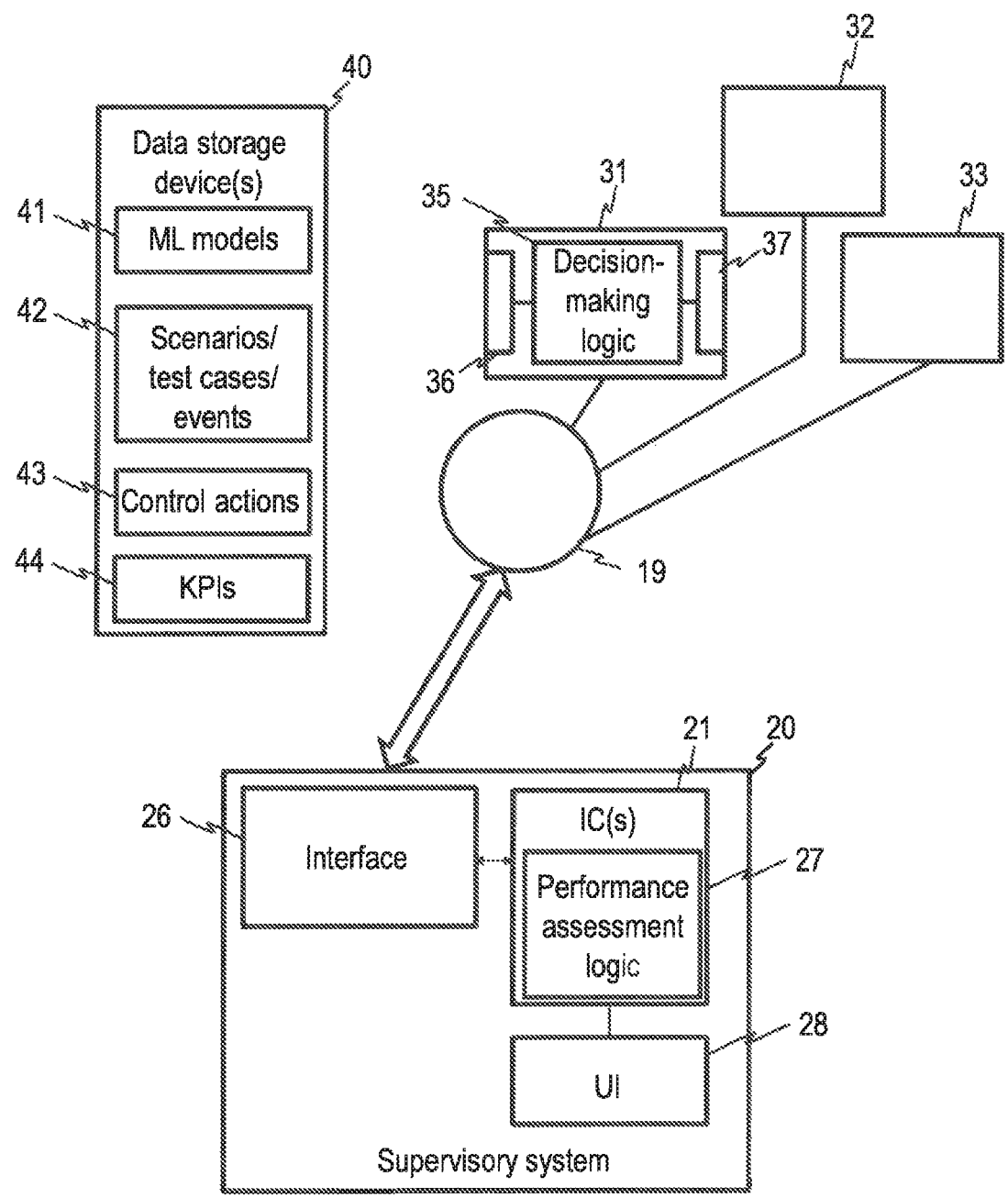
FIG. 2 is a schematic representation of a system comprising a supervisory system according to an embodiment.

FIGS. 1 and 2 are schematic representations of systems comprising a supervisory system according to an embodiment.

The system comprises one or several controllers 31, 32, 33, collectively referred to as controllers. The controllers 31, 32, 33 may respectively be operative to perform functions, such as protection functions, in response to signals from sensors, merging units, intelligent electronic devices (IEDs) or other devices that provide data relating to operation of an IACS, power generation system, power transmission system, or power distribution system. For illustration, one or several of the controllers 31, 32, 33 may be a digital protection relay that determines whether a circuit breaker (CB) is to trip, and whether a trip is an immediate or delayed trip.

The decision-making logic executed by one or several of the controllers 31, 32, 33 may be computer-generated. The decision-making logic executed by one or several of the controllers 31, 32, 33 may respectively be a machine learning (ML) model that has been trained. The decision-making logic 35 may be automatically generated by a decision-making logic generator and may be deployed to the controller 31 for execution during field use of the controller 31.

As used herein, the term "decision-making logic" in particular can refer to the logic that, when executed by a controller 31, 32, 33 of the electric power system (or of another IACS), causes the controller to determine which control action is to be taken in response to signals provided by one or several data sources (sensors, merging units, etc.).

The decision-making logic is specifically designed for the controller in which it is deployed and the function(s) performed by such a controller. If a controller performs plural different functions, plural different decision logics may be deployed in that controller.

Generally, a first controller 31 may have a first decision-making logic deployed therein. A first supervisory system may monitor the first decision-making logic.

A second controller 32 may have a second decision-making logic deployed therein, the second decision-making logic may operate differently from the first decision-making logic. For illustration, the decision-making logic inputs and/or decision-making logic outputs of the second decision-making logic may be different from the decision-making logic inputs and/or decision-making logic outputs of the first decision-making logic. Alternatively or additionally, decision boundaries of the second decision-making logic may be different from decision boundaries of the first decision-making logic, even when the first and second decision-making logics receive the same decision-making logic inputs and/or generate the same type of decision-making logic output signals. Alternatively or additionally, an architecture of the second decision-making logic (e.g., the number of layers, nodes, and/or weights of links of an artificial neural network (ANN) used to operate as the second decision-making logic) may be different from an architecture of the first decision-making logic.

A third controller 33 may have a third decision-making logic deployed therein, the third decision-making logic may operate differently from the first and second decision-making logics. For illustration, the decision-making logic inputs and/or decision-making logic outputs of the third decision-making logic may be different from the decision-making logic inputs and/or decision-making logic outputs of the first and second decision-making logic. Alternatively or additionally, decision boundaries of the third decision-making logic may be different from decision boundaries of the first and second decision-making logics, even when the first, second, and third decision-making logics receive the same decision-making logic inputs and/or generate the same type of decision-making logic output signals. Alternatively or additionally, an architecture of the third decision-making logic (e.g., the number of layers, nodes, and/or weights of links of an artificial neural network (ANN) used to operate as the third decision-making logic) may be different from an architecture of the first and second decision-making logics.

To ensure proper reactions, a variety of controllers 31, 32, 33 may be deployed at all the hierarchical levels of a power system. Some controllers may be local, i.e. they are placed physically close to the power system components. Other controllers may be central, i.e. the decision-making logic is computed in a (sometimes regional) control center, a substation or in the cloud. The techniques disclosed herein, in which a supervisory system is deployed as described more fully herein, are applicable to both local controllers and central controllers.

The controller 31 in which the decision-making logic 35 is deployed may includes at least one integrated circuit. The at least one integrated circuit may comprise a processor, a microprocessor, a controller, a microcontroller, a field-programmable gate array (FPGA), an application specific integrated circuit (ASIC) or any combination thereof, operative to execute the decision-making logic 35.

The controller in which the decision-making logic 35 is deployed has an input interface 36. Inputs to the decision-making logic 35 may be received at or derived from input data and/or input signals received at the input interface 35.

The controller in which the decision-making logic 35 is deployed has an output interface 37. Outputs of the decision-making logic 35 or output commands generated based thereon may be output via the output interface 37. The output interface 37 may be operative to trigger a control action on an associated primary or secondary power system component. The output interface 37 may be operatively coupled with a central control system or a central control center. For illustration, the output interface 37 may be operatively coupled with a substation control center or a regional or national control center for providing operational data associated with the controller 31 thereto.

The controllers 31, 32, 33 may include one or several local controllers in which the decision-making logic 35 is deployed. A local controller monitored by a supervisory system according to the invention may be selected from a group consisting of: The local controller may be selected from a group consisting of: a protection relay, a control systems of a generator (e.g. a governor and exciter/automatic voltage regulator), a control system of high-voltage, direct current (HVDC) device(s), a control system of flexible alternating current transmission system (FACTS) device(s), a decision logic of switched capacitors and/or reactors, an under-frequency shedding relay, and under-voltage load shedding relay, without being limited thereto.

The controllers 31, 32, 33 may include one or several central controllers in which the decision-making logic 35 is deployed. A central controller monitored by a supervisory system may be selected from a group consisting of: an energy management system (EMS)/distribution management system (DMS), e.g., decision-making logic for secondary frequency control, decision-making logic for generation re-dispatch, decision-making logic for utilization of demand flexibility, decision-making logic for reclosing operations, decision-making logic for secondary voltage control by means of reactive power redispatch, decision-making logic coordinating actions across the grid such as in the case of system protection schemes or remedial action schemes which typically need to be activated following a disturbance, without being limited thereto.

Controllable quantities may be selected from the group consisting of: active (P) and reactive (Q) power injections of all generators and energy storage systems; P/Q injections of DC links or back-to-back DC; Q injections of FACTS devices such as a static VAR compensator (SVC) or Static Synchronous Compensator (STATCOM); power flow control devices; tap positions of capacitors banks, reactors and OLTCs; demand; P/Q injections by e-fleets; status of switches/reclosers, etc., without being limited thereto.

Components such as energy storage devices, electric vehicles and various distributed energy resources (DER) can be controlled in a local and/or a centralized manner (e.g. aggregated use of DER or control of a fleet of electric vehicles, offering various grid controllability services). The techniques described herein are applicable to monitoring controllers of DERs and/or energy storage devices, without being limited thereto.

The decision-making logic 35 may be any one of the following, without being limited thereto: (i) a logic in a control system of a FACTS or HVDC device or a generator, (ii) a protection logic in a relay, (iii) a decision-making logic for switching of capacitors/reactors or for shedding load, (iv) a decision-making logic at SCADA/EMS/DMS level, e.g. for frequency/voltage control, reclosing operations, generation re-dispatch or utilization of demand flexibility, (v) a decision-making logic at the EMS/BMS of a site (building, factory, microgrid etc.), (vi) a control logic of converters interfacing resources such as PVs or energy storage, etc.

The decision-making logic 35 takes decisions in response to inputs. The inputs are obtained by relying on system observables. Depending on the case, the observability can be local (e.g. voltage and current at the bus where a flexible alternating current transmission system (FACTS) device(s) is connected), regional, or system-wide (e.g. synchrophasor measurements from a set of network buses.) In addition to electric measurements, the observables received as input by the decision-making logic can include a status of devices (such as status of switches, or various control setpoints), or more generally a dynamical network topology. The observables received as input by the decision-making logic can include input(s) that are exogeneous from the power system, such as observed or forecasted weather, electricity prices, date, time, traffic conditions, etc. The controllers 31, 32, 33 may be equipped with more than one setting groups so that the controller automatically switches between these settings with respect to a change in the conditions of the observed environment.

Frequently, local controllers make decisions based on locally available measurements and central controllers make decisions based on system-wide observability and controls actuators that are throughout the power system. There can be cases, however, where a local controller acts based on input signal coming from remote location(s) in the system or a system-wide control action is initiated based on a local measurement. An example of the first case is the actuation of a FACTS controller for electromechanical oscillation damping (located where it has the most efficient impact) based on remote measurements (located where they provide the best observability.) An example of the second case is congestion alleviation of a line/transformer by means of generation re-dispatch. The techniques of monitoring operation of a decision-making logic disclosed herein are applicable in all of these cases.

The decision-making logic 35 of the controllers 31, 32, 33 is developed when a new controller is to be commissioned. During the design phase, simulations of various conditions in the power grid, such as faults, switching events, changing loading etc., may be performed to evaluate and refine the performance of the control logic. The techniques of monitoring the decision-making logic lend themselves to application when the decision-making logic 35 is generated in a computer-implemented manner, e.g., by training a machine learning (ML) model.

Once in operation, the performance of controllers 31, 32, 33 may deteriorate. This may have various reasons. For illustration, performance may degrade when an environment for which the controller was designed changes significantly. This may be the case when there are power system topology changes, new power system components, and/or new grid codes, etc. The controller 31, 32, 33 may face different conditions compared to what it was designed for; leading to inefficient or irrelevant decisions or actuations in response to events. In addition, understanding and coordinating the inter-operability of controllers 31, 32, 33 at various locations in the network (e.g., of conventional generators and converter-interfaced components) is not trivial.

The supervisory system 20 can monitor the decision-making logic 35 of a controller 31, 32, 33 during field operation of the controller. A deterioration of the decision-making logic 35, which may be determined in accordance with one or several key performance indicators or another performance metric, may be detected by the supervisory system 20. The supervisory system 20 may also be equipped with a mechanism to predict a future change in system operating conditions and/or identify changes in the electric power system or industrial system that cause the decision-making logic 20 to underperform, as will be explained more fully herein.

Different supervisory systems may be deployed for different decision-making logics (e.g., the decision-making logics in controllers 31, 32, 33). Each supervisory systems may be associated with a different one of the decision-making logics deployed in the controllers 31, 32, 33 of the system. Each supervisory system may be specifically set up so as to monitor performance of its associated decision-making logic during field operation, and/or to perform root-cause identification and/or root-cause resolution for poor performance during field operation.

Different supervisory systems (in particular different performance assessment logics deployed therein) for different decision-making logics may receive different inputs captured online during field operation (which are also referred to as scenario signature herein), may process the inputs differently depending on the decision-making logic with which the supervisory system is associated, and/or may generate different outputs depending on the decision-making logic with which the supervisory system is associated.

The decision-making logic 35 monitored by the supervisory system 20 may be a decision-making logic that is generated in a computer-implemented manner prior to its deployment for field use. Data that was generated or otherwise used in the process of generating the decision-making logic 35 may be stored in one or several data storage device(s) 40. This data is generated or otherwise used when the decision-making logic 35 is created, i.e., prior to field operation of the decision-making logic 35. Thus, the data that was generated or otherwise used in the process of generating the decision-making logic 35 will also be referred to as "pre-operational data" herein for brevity.

As will be explained more fully herein, the supervisory system 20 can make use of the "pre-operational data" for monitoring performance of the decision-making logic 35. This may be done in various ways. The supervisory system 20 may retrieve the pre-operational data during field operation of the controller 31 and may use the pre-operational data in combination with operational data collected during field operation of the controller 31 to assess the performance of the decision-making logic 35, as illustrated in FIG. 1.

Alternatively or additionally, the supervisory system 20 may execute a performance assessment logic 27 to assess the performance of the decision-making logic 35, as illustrated in FIG. 2. The performance assessment logic 27 may be a logic that is generated using the pre-operational data in the data storage device(s) 40, but which can perform the performance assessment autonomously without having to access the pre-operational data in the data storage device(s) 40 during field operation of the controller 31.

The supervisory system 20 may receive a performance metric or plural performance metrics to measure a performance of the decision-making logic 35. The performance metric may define a set of key performance indicators (KPIs.) This performance metric or set of performance metrics may be used for the assessment process.

The supervisory system 20 may optionally receive models of power system topology, power system components, and/or various primary and/or secondary devices in a part of the power system which is relevant to the supervised controller. This information relating to the power network, which may in particular include topological information, may be received via the user interface (UI) 28. Alternatively or additionally, the supervisory system 20 or a network topology analysis system may process a configuration description (such as a substation configuration description (SCD) file) to determine power system topology, identify power system components, and/or various primary and/or secondary devices in a part of the power system which is relevant to the supervised controller.

The supervisory system 20 may collect and store power system data relevant to the controller 31 it supervises. Examples of such data are: (i) local data such as voltage and current signals at the bus where the controller is located or from adjacent buses, (iii) data from system-wide measurements, as well as (iv) data from EMS/DMS such as unit commitment results, demand and generation forecasts for the next time step.

The supervisory system 20 may perform model identification/calibration based on the collected data. A communication framework with other controllers 32, 33 within the immediate vicinity of the controller 31 can be used so that multiple supervisory systems 20 can exchange models as well as data.

The supervisory system 20 performs analysis to assess the decision-making logic via simulations or data-driven methods and using the key performance indicators (KPI). Implementations of this analysis are described more fully herein.

If the decision-making logic 35 of the controller 31 is not performing well enough, as determined in accordance with a performance metric, the supervisory system 20 may take an appropriate action. This may involve raising a flag to a human expert. The supervisory system 20 may be operative to generate an alarm, warning, or other output for outputting via a human-machine interface (HMI) if the performance of the decision-making logic 35 of the controller 31 does not meet a pre-defined criterion, which may optionally be based on the performance metric.

Alternatively or additionally, the supervisory system 20 may be operative to take a control action. For illustration, the supervisory system 20 may schedule down-times, trigger maintenance personnel deployment, trigger precautionary control actions, or take other actions if the performance of the decision-making logic 35 of the controller 31 does not meet a pre-defined criterion, which may optionally be based on the performance metric.

The control action may include triggering a re-design and new deployment of the decision-making logic 35, based on the observed behavior during field operation of the controller 31. The supervisory system 20 may be operative to interact with a decision-making logic generator system that generates the decision-making logic for deployment in an autonomous manner.

The supervisory system 20 may be operative to determine and optionally output information on a probable root-cause or explanation on why the performance of the decision-making logic 35 has deteriorated, as explained in more detail below.

The supervisory system 20 may be an artificial intelligence (AI) supervisory system—

In order to assess operation of the decision-making logic 31, the supervisory system 20 may use the following:

Data generated during the creation phase of the decision-making logic 35 of the controller 31 that is supervised by the supervisory system 20. This data may be used in various ways. For illustration, the data can be accessed continually, i.e., in an ongoing basis, during operation of the supervisory system 20 and during field operation of the controller 31. Alternatively or additionally, the supervisory system 20 may execute a performance assessment logic that is generated based on the data generated during the creation of the decision-making logic, without having to access the data generated during the creation phase during field operation of the supervisory system 20 and of the controller 31.

Data collected via measurements in the field after the controller is deployed (i.e. online, operational data). This data may include inputs received by the controller 31 executing the decision-making logic 35 at an input interface 36. This data may include controller outputs output by the controller 31 executing the decision-making logic 35 at an output interface 37.

The supervisory system 20 may operate in field operation of the controller 31, utilizing the information which was generated during the phase of generating the decision-making logic 35 in order to assess the controller's performance during field operation. This may be done in real time.

The supervisory system 20 may continually assess whether the operating conditions observed during field operation were part of the scenarios in the generation phase of the controller and may take a control action based thereon.

The supervisory system 20 may be generated prior to field operation of the controller 31, as part of a combined generation process that generates both the decision-making logic 35 and the performance assessment logic that evaluates the decision-making logic, as will be explained in more detail with reference to FIG. 2.

The supervisory system 20 may deduce not only the quality of the performance but, in case of observed performance deterioration, also potential causes for the performance deterioration.

The supervisory system 20 may be implemented by computing devices or distributed computing systems. The supervisory system 20 includes at least one integrated circuit 21. The at least one integrated circuit 21 may comprise a processor, a microprocessor, a controller, a microcontroller, a field-programmable gate array (FPGA), an application specific integrated circuit (ASIC) or any combination thereof.

The supervisory system 20 may have a user interface (UI) 28. The user interface 28 may include an optical output device. The supervisory system 20 may be operative to receive, via the user interface 28, information on a performance metric. The information on the performance metric may specify one or several KPIs. The information on the performance metric may specify several KPIs and a relative weighting of the KPIs, used to quantitatively determine the performance of the decision-making logic 35.

The supervisory system 20 may generate output based on an analysis of the performance of the decision-making logic 35. The output may include one or several of the following:
- information on one or several KPIs of the decision-making logic 35 determined during field operation of the controller 31,
- alarms, warning, or other information derived therefrom, and
- control commands or other control signals that trigger an action, such as an automatic re-generation or update of the decision-making logic 35.

The supervisory system 20 may have at least one interface 26 for receiving data during field operation of the controller 31 in which the decision-making logic 35 is deployed. The data received via the at least one interface 26 may include:
- information on inputs processed by the decision-making logic 35; this information may be received by the supervisory system 20 via a push mechanism or a pull mechanism from the controller 31 on which the decision-making logic 35 is deployed and/or from other system devices;
- optionally, information on the decisions taken by the decision-making logic 35; this information may be received by the supervisory system 20 via a push mechanism or a pull mechanism from the controller 31 on which the decision-making logic 35 is deployed and/or from other system devices.

It is noted that an assessment of the decision-making logic 35 may be performed without necessarily requiring knowledge of the decisions taken by the decision-making logic 35. For illustration, the supervisory system 20 may compare the operational scenarios encountered by the decision-making logic 35 during field operation of the controller 31 to those scenarios for which it was trained. Alternatively or additionally, the supervisory system 20 may compare a power grid topology encountered by the decision-making logic 35 during field operation of the controller 31 to power grid topologies for which the decision-making logic 35 was trained. Alternatively or additionally, the supervisory system 20 may compare specifications of secondary or primary devices with which the controller 31 interacts during field operation with specifications used when training the decision-making logic 35. This allows a possible deterioration to be identified, without using the decisions output by the decision-making logic 35 or control commands output by the controller 31 based on the decisions.

The supervisory system 20 may also retrieve and use information on the decisions taken by the decision-making logic 35 during field operation of the controller 31 and may use that information for performance assessment.

The controllers 31, 32, 33 may provide operational data to the supervisory system 20 via a communication network 19. The operational data is used for performing a performance assessment and, optionally, for storing in a data storage device. The operational data may include information on scenarios encountered by the decision-making logic 35 during field operation of the controller 31. The operational data may include information on inputs received by and/or outputs generated by the controllers 32, 33 other than the controller 31 in which the decision-making logic 35 is deployed. Such information on inputs received by and/or outputs generated by the controllers 32, 33 allows the supervisory system 20 to draw conclusions on power system topology, scenarios encountered by the decision-making logic 35 during field operation of the controller 31, and/or functionality of primary and secondary devices associated with controllers 32, 33 other than the controller 31 in which the decision-making logic 35 is deployed.

The supervisory system 20 may make use of data used in a computer-implemented process of generating the decision-making logic 35 (which is referred to as "pre-operational data" herein), in order to analyze the performance of the decision-making logic 35 during operation.

The decision-making logic 35 may be generated in a process that includes one or several machine learning (ML) models. Supervised ML may be used to train a decision-making logic ML model. The decision-making logic ML model may include an artificial neural network (ANN) or plural ANNs.

As used herein, "training the ML model" refers to the process of determining parameter values for parameters of the ML model. For illustration, training the ML model may include determining the weights of an ANN.

The process of generating the decision-making logic 35 may involve a selection from plural different candidate decision-making logic ML models. The different decision-making logic ML models may be different in ML setup (e.g., ANNs with different numbers of hidden layers etc.). The process of generating the decision-making logic 35 may involve selecting a trained decision-making logic ML model from a plurality of trained candidate decision-making logic ML models, in accordance with their performance when facing a set of test scenarios.

Information on the decision-making logic ML models 41 that were evaluated in the process of generating the decision-making logic 35 may be stored in the data storage device(s) 40. The supervisory system 20 may be operative in dependence on the information on the decision-making logic ML models 41 when analyzing the decision-making logic 35 during field operation of the controller 31. This may be done by retrieving information on the decision-making logic ML models 41 while the supervisory system 20 monitors the decision-making logic 35 in field operation of the controller and/or by using the information on the decision-making logic ML models 41 when setting up a performance-assessment logic of the supervisory system 20.

The process of generating the decision-making logic 35 may involve confronting decision-making logic ML models with plural test scenarios and determining their performance. The plural test scenarios may include define inputs to the candidate decision-making logic ML models during the process of generating the decision-making logic 35. The test scenarios may be set up in dependence on a specification for the controller 31 (e.g., based on power system topology, based on the functions which the controller 31 must be able to perform, and based on the other controllers 32, 33 of the power system with which the controller 31 interacts in field operation). The test scenarios may be different from each other with regard to simulated power system parameters (such as voltage, current, phasor, or impedance measurements, which may be simulated for three phases). Alternatively or additionally, the test scenarios may be different from each other with regard to changes in a dynamic power system topology (such as changes resulting from circuit breaker (CB) trips or reclosing). Alternatively or additionally, the test scenarios may be different from each other with regard to power demand and/or power generation curves (which may be dependent on different simulated weather conditions, for example). Alternatively or additionally, the test scenarios may be different from each other with regard to events that are simulated, such as failure of a DER generator unit, failure of a transmission or distribution line, or other possible events.

The test scenarios may include a set of exogeneous test scenarios which may be based on historical data and/or which may be defined by a human expert.

The test scenarios may computer-generated scenarios. For illustration, when a generative adversarial network (GAN) technique is used to generate both the decision-making logic 35 and a scenario-generating ANN during the process of generating the decision-making logic 35, test scenarios generated by a discriminator ANN may be included in the test scenarios 42 stored in the data storage device(s) 40.

Information on the scenarios 42 that were evaluated in the process of generating the decision-making logic 35 may be stored in the data storage device(s) 40. The supervisory system 20 may be operative in dependence on the information on the scenarios 42 when analyzing the decision-making logic 35 during field operation of the controller 31. This may be done by retrieving information on the scenarios 42 while the supervisory system 20 monitors the decision-making logic 35 in field operation of the controller and/or by using the information on the scenarios 42 when setting up a performance-assessment logic of the supervisory system 20.

The process of generating the decision-making logic 35 may involve monitoring decisions taken by the candidate decision-making logic ML model. The decisions taken by the candidate decision-making logic ML model may be control actions. The decisions may be recorded for each of the various candidate decision-making logic ML models, respectively in association with the scenario with which the candidate decision-making logic ML model was confronted.

For illustration, the candidate decision-making logic ML models used in generating the decision-making logic 35 may be classifiers that, in response to a set of inputs, output one of a pre-defined set of possible outputs. The different outputs may correspond to different control actions.

Information on the decisions 43 that were taken by the candidate decision-making logic ML model in the process of generating the decision-making logic 35 may be stored in the data storage device(s) 40. The supervisory system 20 may be operative in dependence on the information on the decisions 43 when analyzing the decision-making logic 35 during field operation of the controller 31. This may be done by retrieving information on the decisions 43 while the supervisory system 20 monitors the decision-making logic 35 in field operation of the controller and/or by using the information on the decisions 43 when setting up a performance-assessment logic of the supervisory system 20.

The process of generating the decision-making logic 35 may involve determining performance of the candidate decision-making logic ML model(s). This may involve computing one or several KPIs. The one or several KPIs may quantify the performance. The one or several KPIs may be selected or otherwise specified by a human input prior to starting the generation of the decision-making logic 35. The one or several KPIs used in the process of generating the decision-making logic 35 may, but do not need not be the same as the one or several KPIs determined by the supervisory system 20 during field operation of the controller 31.

For illustration, the candidate ML models used in generating the decision-making logic 35 may be classifiers that, in response to a set of inputs, output one of a pre-defined set of possible outputs. The different outputs may correspond to different control actions. The KPIs may compare the control actions taken by the candidate ML models in the process of generating the decision-making logic 35 to historical labeled data or decision boundaries derived therefrom.

Information on the KPIs 44 of the decisions taken by the candidate ML model in the process of generating the decision-making logic 35 may be stored in the data storage device(s) 40. The supervisory system 20 may be operative in dependence on the information on the KPIs 44 when analyzing the decision-making logic 35 during field operation of the controller 31. This may be done by retrieving information on the KPIs 44 while the supervisory system 20 monitors the decision-making logic 35 in field operation of the controller and/or by using the information on the KPIs 44 when setting up a performance-assessment logic of the supervisory system 20.

Irrespective of whether or not the supervisory system 20 accesses the data storage device(s) 40 during field operation of the controller 31, the supervisory system 20 may be implemented in various ways.

Figure 3:
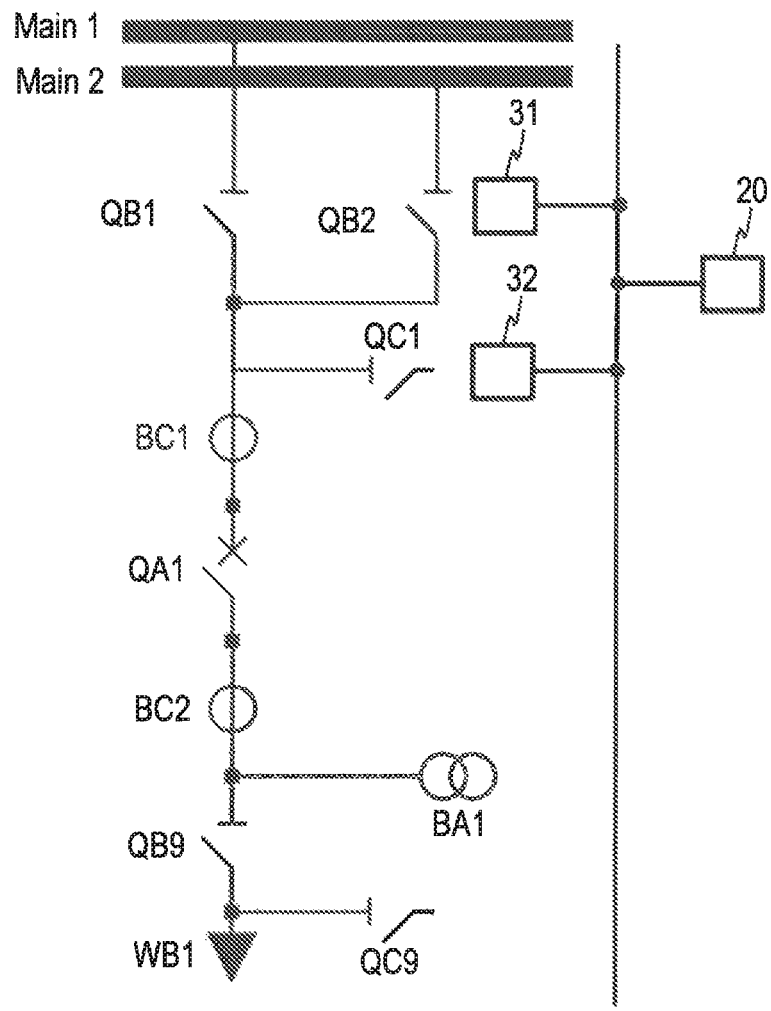
FIG. 3 is a schematic representation of a system in which a supervisory system is provided separately from controllers.
Figure 4:
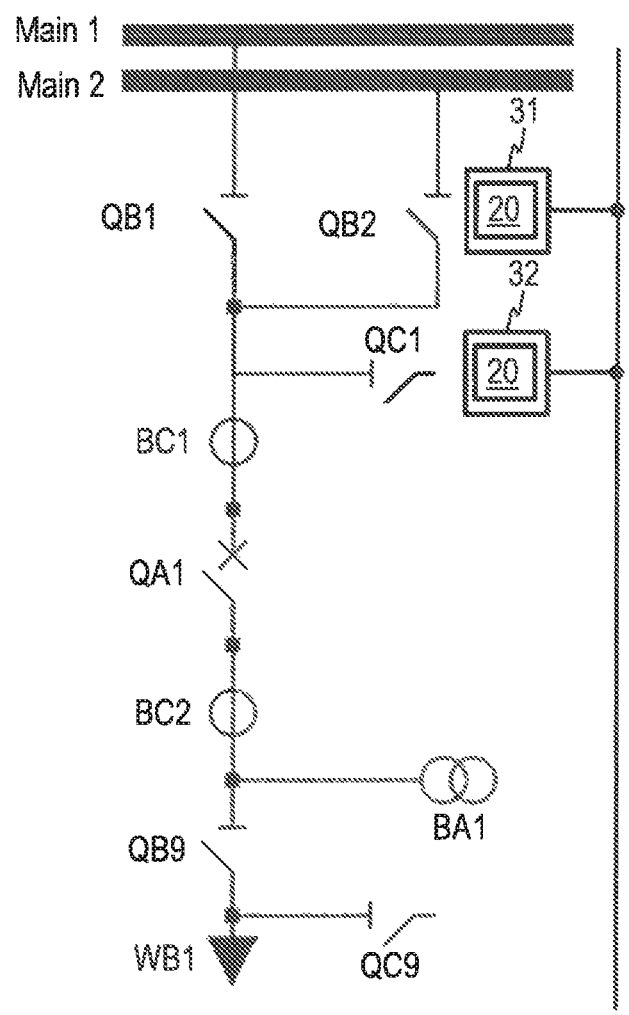
FIG. 4 is a schematic representation of a system in which a supervisory system is integrated into controllers.

The supervisory system 20 may be executed on computing infrastructure of a device/actuator which is in the field (e.g. a STATCOM), on computers or servers of a central/regional control center or a substation, or on a cloud-based computer or server infrastructure, as illustrated in FIGS. 3 and 4.

FIG. 3 is a schematic diagram illustrating a supervisory system 20 and controllers 31, 32 in which a decision-making logic is deployed, used in conjunction with components of a power distribution or generation system. For illustration, a bay of a power substation may include switches QB1, QB2, QC1, AQ1, QB9, and QC9, transformers BC1, BC2 for current sensing and transformers BA1 for voltage sensing. Sensor devices are deployed to generate raw signals that may be provided, optionally via a merging unit or other unit that may optionally perform pre-processing, to the controllers 31 and 32.

As illustrated in FIG. 3, the supervisory system 20 may be provided separately from the controllers 31, 32 and may be communicatively coupled thereto. For illustration, the supervisory system 20 may be deployed on computers or servers of a central/regional control center or a substation, or on a cloud-based computer or server infrastructure.

The supervisory systems 20 may execute different performance assessment logic and/or may access different data elements in the data storage device(s) 40, depending on whether the supervisory system assesses performance of a first decision-making logic of a first controller 31 or of a second decision-making logic of a second controller 32. Different performance metrics may be defined for the different first and second controllers 31, 32 and/or for different decision-making logics.

FIG. 4 is a schematic diagram illustrating controllers 31, 32 in which a decision-making logic is deployed, used in conjunction with components of a power distribution or generation system. For illustration, a bay of a power substation may include switches QB1, QB2, QC1, AQ1, QB9, and QC9, transformers BC1, BC2 for current sensing and transformers BA1 for voltage sensing. Sensor devices are deployed to generate raw signals that may be provided, optionally via a merging unit or other unit that may optionally perform pre-processing, to the controllers 31 and 32.

As illustrated in FIG. 4, the controllers 31, 32 each include a dedicated supervisory system 20.

A first supervisory system 20 may be deployed on a first controller 31. The first supervisory system 20 may assess performance of a decision-making logic of the first controller 31 during field operation thereof.

A second supervisory system 20' may be deployed on a second controller 32. The second supervisory system 20' may assess performance of a decision-making logic of the second controller 32 during field operation thereof.

The first and second supervisory systems 20, 20' may be distinct from each other and may be tailored in accordance with the functions performed by the controllers 31, 32 in which they are deployed.

While only two controllers 31, 32 are illustrated in FIGS. 3 and 4, the techniques disclosed herein are applicable to any number N of controllers and/or any number M of decision-making logics executed thereby.

As shown in FIG. 4, the supervisory system 20 may be implemented on computing infrastructure of a device/actuator which is in the field (e.g. a STATCOM).

Figure 5:
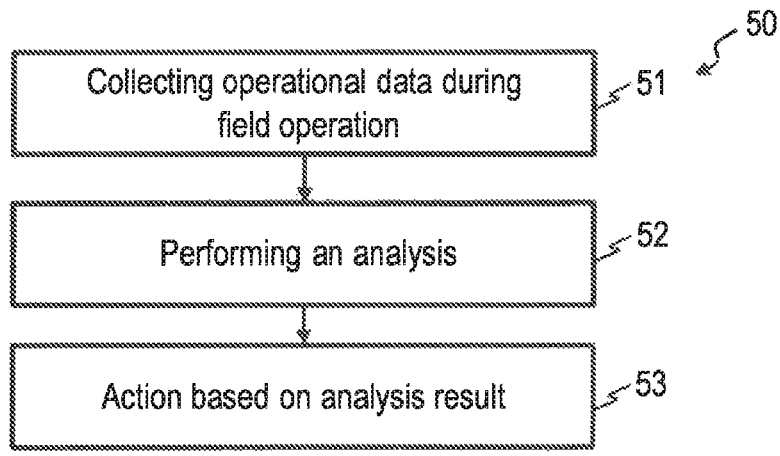
FIG. 5 is flow chart of a method.

FIG. 5 is a flow chart of a method 50. The method 50 may be automatically performed by the supervisory system 20 of any one of FIGS. 1 to 4.

At step 51, operational data is collected. The operational data may be or may include data of the industrial or electric power system that affects inputs of the decision-making logic 35. The operational data may optionally include information on the outputs of the decision-making logic 35, respectively in association with the data of the of the industrial or electric power system that affects inputs of the decision-making logic 35. The operational data may include data of the industrial or electric power system that defines a topology and/or capabilities of the components of the industrial or electric power system (e.g., in the form of a configuration description).

At step 52, an analysis is performed to assess performance of the decision-making logic 35. This may comprise evaluating whether the decision-making logic 35 is faced with scenarios that are significantly different from the scenarios used to train the decision-making logic (as determined, e.g., in accordance with a norm applied to a different in input vectors). Step 52 may comprise determining whether KPIs of the decision-making logic 35, determined during field operation of the controller 31, match KPIs determined in the process of generating the decision-making logic 35. Step 53 may comprise determining whether models (such as topological models or load flow models) used when generating the decision-making logic 35 match the configuration and behavior of the electric power system.

The analysis at step 52 may comprise determining a likely root-cause as to why the decision-making logic 35 underperforms and/or a predictive analysis of the performance, as described more fully herein.

At step 53, an action may be automatically taken by the supervisory system 20. This may be done selectively depending on whether the analysis at step 52 indicates that the decision-making logic is currently or in the future no longer suitable for performing the function for which it was designed.

The action at step 53 may take various forms: The action may comprise generating an alarm, warning, or other output for outputting via a human-machine interface (HMI) if the performance of the decision-making logic 35 of the controller 31 does not meet a pre-defined criterion, which may optionally be based on a received performance metric.

Alternatively or additionally, the action at step 53 may comprise a control action. The control action may be selected from a group consisting of scheduling down-times, triggering maintenance personnel deployment, triggering precautionary control actions, or taking other actions if the performance of the decision-making logic 35 of the controller 31 does not meet a pre-defined criterion, which may optionally be based on a received performance metric.

Alternatively or additionally, the action at step 53 may include triggering a re-design and new deployment of the decision-making logic 35, based on the observed behavior during field operation of the controller 31. The supervisory system 20 may be operative to interact with a decision-making logic generator system that generates the decision-making logic for deployment in an autonomous manner.

Figure 6:
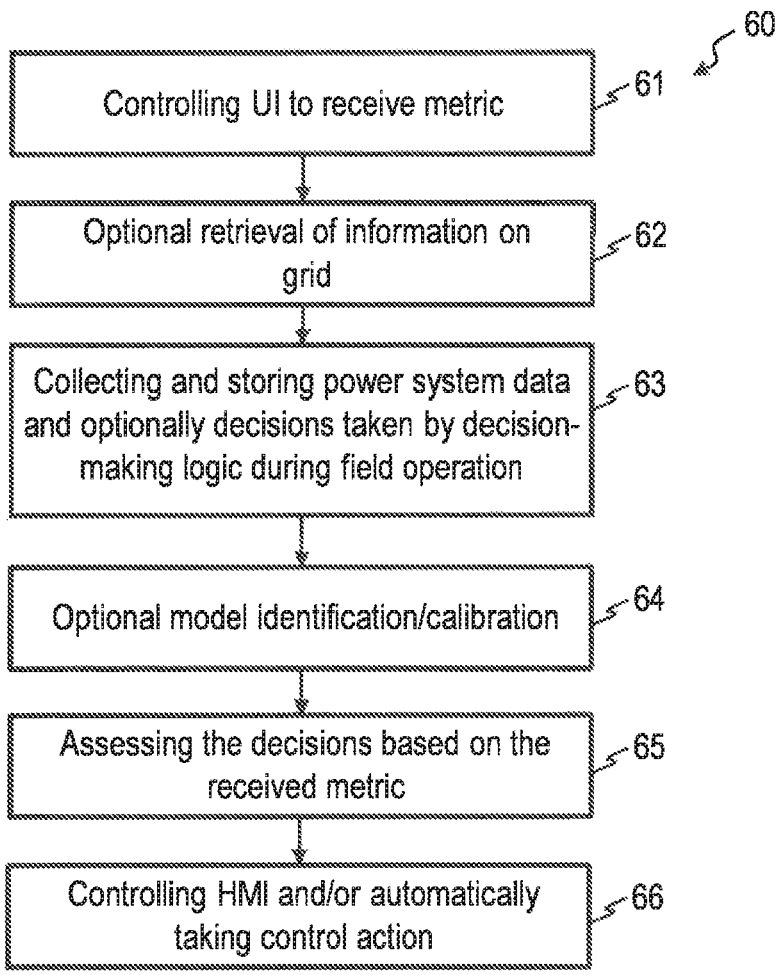
FIG. 6 is flow chart of a method.

FIG. 6 is a flow chart of a method 60. The method 60 may be automatically performed by the supervisory system 20 of any one of FIGS. 1 to 4.

At step 61, the UI 27 may be controlled to allow a user to specify a performance metric. This may comprise controlling the UI 27 to allow inputting a metric to measure the performance of the decision-making logic 35. The metric may define one KPI or a set of KPIs. When several KPIs are used, the received input may include weighting factors that define a relative importance of the KPIs. For illustration, a performance may be quantitatively computed as a weighted sum of KPIs, $$p = \Sigma_{i=1,\ldots,n} w_i \times KPI_i \quad (1)$$

where KPI are different key performance indicators and $w_i$ are the associated weights. The KPIs may a metric. For illustration, when a KPI is intended to quantify how close a scenario encountered by the decision-making logic 35 is to the scenarios for which it was trained, the KPI may be defined as $$KPI = \min_J \| \vec{IV} - \vec{IV}_J \| \quad (2)$$

where $\vec{IV}$ denotes an input vector to the decision-making logic that corresponds to the current field operation conditions and $\vec{IV}_J$ denote the inputs corresponding to the test scenarios used when generating the decision-making logic 35, with J being a label for the test scenarios.

Other examples of performance KPIs may include minimizing cost of electricity, increasing grid power transfer limits, ensuring stability, maximizing protection objectives of security and dependability, keeping voltages and currents within limits, maximizing economic benefit, without being limited thereto.

At step 62, the supervisory system 20 may optionally retrieve information on the power system or industrial system. For illustration, the supervisory system 20 may receive first principal or statistical models of grid topology, grid components and/or various actors in a part of the grid which is relevant to the supervised controller 31. Alternatively or additionally, the supervisory system 20 may receive and analyze a configuration description (such as a SCD file) to determine the relevant information on the power system or industrial system.

At step 63, the supervisory system 20 may continually collect power system or industrial system data relevant to the controller 31 it supervises. Examples of such data are: (i) local data such as voltage and current signals at the bus where the controller is located or from adjacent buses, (iii) data from system-wide measurements, as well as (iv) data from EMS/DMS such as unit commitment results, demand and generation forecasts for a next time step. At step 63, the collected data may be stored. This may be done locally at the supervisory system 20 or remotely from the supervisory system 20, e.g., in a data storage system in a cloud-based computing infrastructure.

At step 64, the supervisory system 20 may optionally perform model identification and/or calibration based on the data collected at step 63. The supervisory system 20 may optionally communicate with controllers 32, 33 (or their associated supervisory systems) other than the controller 31 in which the supervised decision-making logic 35 is deployed for model identification and/or calibration.

At step 65, the supervisory system 20 may perform an analysis to assess the decision-making logic. The supervisory system 20 may perform simulations and/or may use data-driven methods in the analysis. The supervisory system may quantitatively determine the performance in accordance with the KPI(s). Implementations of the analysis step will be described in more detail herein.

At step 66, the supervisory system 20 may control an HMI and/or may take another action based on a result of the analysis. For example, if the decision-making logic 35 in the controller 31 is not performing well enough, the supervisory system 20 may generate an output for a human expert to alert him of this situation. The supervisory system 20 may also provide a root-cause resolution, i.e., propose a reason or explanation on why the performance of the decision-making logic has deteriorated. Alternatively, or additionally, the supervisory system 20 can initiate an autonomous re-design process by activating a decision-making logic generator to re-generate the decision-making logic 35.

Figure 7:
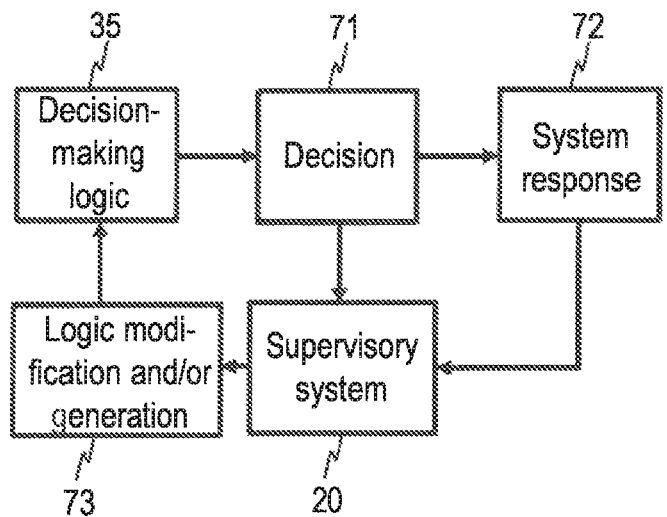
FIG. 7 is signal flow chart.

FIG. 7 is a block diagram illustrating a supervisory system 20 interacting with a logic generation and/or modification device 73. The supervisory system 20 may be the supervisory system 20 of any one of FIGS. 1 to 4.

The decision-making logic 35 generates decisions 71 during field operation. The decisions 71 may include or be control actions.

The decisions 71 taken during field operation trigger a system response 72. The system response 72 may include decision(s) taken by further decision-making logic(s) other than the decision-making logic 35. The further decision-making logic(s) may include one or several further decision-making logic(s) deployed in the same controller 31 as the decision-making logic 35 and/or one or several further decision-making logic(s) deployed in controllers 32, 33 other than the controller 31. The system response 72 may include observables, such as currents, voltages, phasors, impedances, synchrophasors, or other observables. The system response 72 may include a change in dynamic system topology (e.g., when the decision 71 is a disconnect or reconnect command).

The supervisory system 20 may receive the decision 71 and the system response 72. The supervisory system 20 may assess the performance of the decision-making logic 20. A performance metric may be evaluated to assess the performance, optionally using one or several KPIs.

If the performance determined by the supervisory system 20 does not meet a performance criterion (for illustration, if a performance computed in accordance with the performance metric does not fulfil a performance threshold criterion), the supervisory system 20 may trigger a logic modification and/or generation unit 73 to modify the decision-making logic 35 and/or to generate a modified decision-making logic 35. The modified decision-making logic 35 may be deployed to the controller 31, without requiring a replacement of the controller 31.

Figure 8:
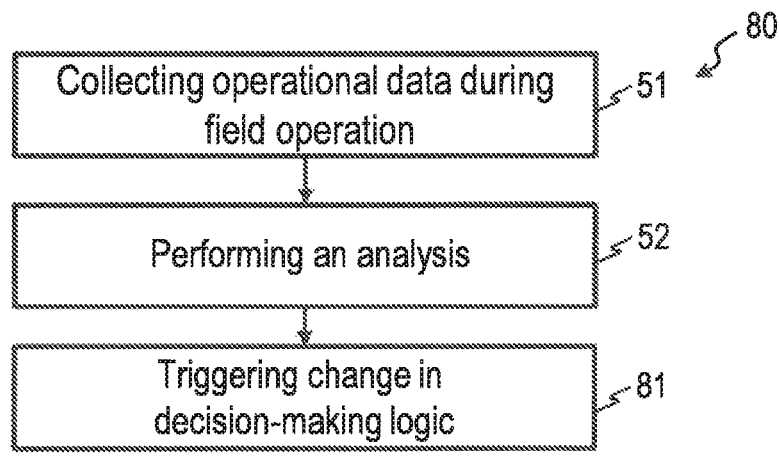
FIG. 8 is flow chart of a method.

FIG. 8 is a flow chart of a method 80. The method 80 may be automatically performed by the supervisory system 20 of any one of FIGS. 1 to 4.

At step 51, operational data is collected. The operational data may be or may include data of the industrial or electric power system that affects inputs of the decision-making logic 35. The operational data may optionally include information on the outputs of the decision-making logic 35, respectively in association with the data of the of the industrial or electric power system that affects inputs of the decision-making logic 35. The operational data may include data of the industrial or electric power system that defines a topology and/or capabilities of the components of the industrial or electric power system (e.g., in the form of a configuration description).

At step 52, an analysis is performed to assess performance of the decision-making logic 35. This may comprise evaluating whether the decision-making logic 35 is faced with scenarios that are significantly different from the scenarios used to train the decision-making logic (as determined, e.g., in accordance with a norm applied to a different in input vectors). Step 52 may comprise determining whether KPIs of the decision-making logic 35, determined during field operation of the controller 31, match KPIs determined in the process of generating the decision-making logic 35. Step 53 may comprise determining whether models (such as topological models or load flow models) used when generating the decision-making logic 35 match the configuration and behavior of the electric power system.

The analysis at step 52 may comprise determining a likely root-cause for why the decision-making logic 35 underperforms and/or a predictive analysis of the performance, as described more fully herein.

At step 81, if a performance determined by the supervisory system 20 does not meet a performance criterion (for illustration, if a performance computed in accordance with the performance metric does not fulfil a performance threshold criterion), the supervisory system 20 may trigger a logic modification of the decision-making logic 35 and/or may trigger a generation of and deployment of a modified decision-making logic 35. The modified decision-making logic 35 may be deployed to the controller 31, without requiring a replacement of the controller 31.

The generation and deployment of a modified decision-making logic at block 73 in FIG. 7 or at step 81 in FIG. 8 may be performed by an autonomously operating decision-making logic generator.

Figure 9:
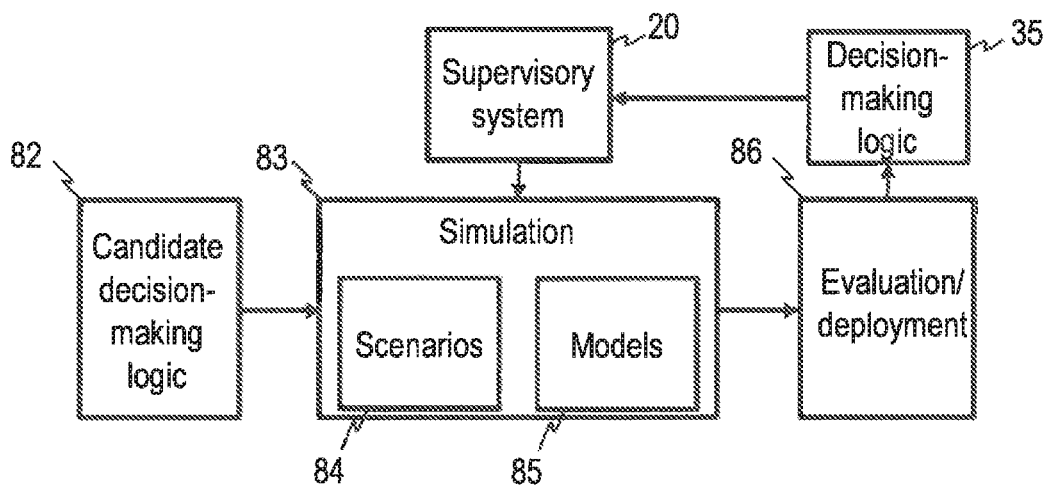
FIG. 9 is a block diagram of a system.

FIG. 9 is a block diagram illustrating interaction of the supervisory system 20 with a decision-making logic generator.

The decision-making logic generator uses a set 82 of candidate decision-making logic(s). The set 82 may be a set of different decision-making logic ML models. For illustration, the set 82 may include support vector machines, ANNs with different numbers of hidden layers, or other decision-making logic ML models.

A simulation engine 83 is provided to simulate behavior of several candidate decision-making logics in the set 82 in response to various scenarios 84 and/or using different models 85.

The scenarios 84 may respectively represent different operating conditions in the electric power system or industrial system.

The models 85 may represent behavior of the controller 31, of other controllers 32, 33, and/or of other primary or secondary devices in the electric power system or industrial system, in response to decisions taken by the decision-making logic 35. Various processing techniques may be used to simulate the effects of decisions taken by the candidate decision-making logic on system quantities. For illustration, the models 85 may include power flow simulation, numerical simulations of system response in the time and/or frequency domain, calculation of transients, optimal power flow calculation, eigenvalue analysis, or other processing techniques.

Based on a performance of the candidate decision-making logics 82 under the scenarios simulated by the simulation engine 83, one of the candidate decision-making logics 82 is selected for deployment 86.

While not shown in FIG. 9, the simulation engine 83 and evaluation engine 86 may perform an optimization routine to train the candidate decision logic. This may involve supervised learning using labeled data or gradient descent techniques, without being limited thereto.

In the optimization routine, the performance of the decision-making logic is assessed by simulating a set of test scenarios. Models 85 of the various system components (including the controller 31 itself, as well as other controllers 32, 33 which are operating in the same grid environment) are utilized. The performance of the candidate decision-making logic is quantified by applying a set of KPIs to the simulation results. The process may be repeated until convergence is attained. Examples of performance KPIs may include minimizing cost of electricity, increasing grid power transfer limits, ensuring stability, maximizing protection objectives of security and dependability, keeping voltages and currents within limits, maximizing economic benefit, without being limited thereto.

The performance of the deployed decision-making logic 35 is monitored by the supervisory system 20 during field operation of the decision-making logic 35. Results of the analysis performed by the supervisory system 20 may be fed back to the decision-making logic generator.

For illustration, the supervisory system 20 may determine whether scenarios faced by the decision-making logic 35 during field operation are sufficiently similar to at least one of the scenarios 84 used during the generation of the decision-making logic 35. If scenarios are identified during field operation which are not similar to any one of the previously used scenarios 84, the information on the scenario (e.g., an input vector for the decision-making logic 35 encountered during field operation) may be fed back to the decision-making logic generator.

Alternatively or additionally, the supervisory system 20 may determine whether the models 85 used to simulate the system response when generating the decision-making logic 35 validly reflect the actual system response behavior as observed during field operation of the decision-making logic 35. Information on a mismatch may be fed back, in order to improve the model(s) 85.

Figure 10:
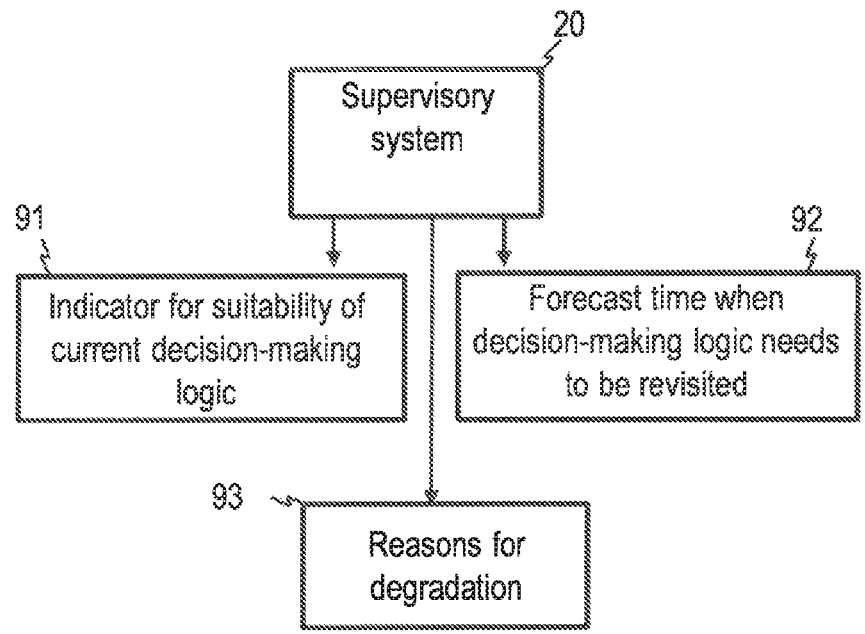
FIG. 10 is a diagram illustrating operation of a supervisory system.

FIG. 10 is a diagram illustrating output that may be generated by the supervisory system 20 of any one of FIGS. 1 to 4, additionally or alternatively to causing the decision-making logic 35 to be modified.

The supervisory system 20 may perform an analysis of the decision-making logic 35 during field operation of the controller 31 to generate and output an indicator 91. The indicator 91 may indicate whether the decision-making logic 35 has a performance that meets a performance criterion (for illustration, whether the performance as computed in accordance with a performance metric meets a threshold comparison). The indicator 91 may be selected from a discrete set of values. The indicator 91 may be binary, indicating whether the performance is deemed sufficient or insufficient. The indicator 91 may be selected from a set of three or more than three discrete values, indicating whether the performance is safe, requires attention, or is insufficient. Plural threshold comparisons may be performed for the performance as computed in accordance with a performance metric in order to determine which one of the plural discrete values is to be output. The indicator 91 may also be taken from a continuous range of values. The continuous range of values may represent a "health" or "degradation" index within a pre-defined interval, e.g., from 0 to 1, and may be computed in accordance with the performance metric.

Alternatively or additionally, the supervisory system 20 may perform an analysis of the decision-making logic 35 during field operation of the controller 31 to generate and output a forecast time 92, indicating when the decision-making logic may need to be revisited. The forecast time 92 may be computed based on a time-evolution of a performance as observed by the supervisory system 20. Alternatively or additionally, one or several predictors may be used, which may be implemented by recurrent neural networks, as explained in more detail herein.

Alternatively or additionally, the supervisory system 20 may perform an analysis of the decision-making logic 35 during field operation of the controller 31 to generate and output information 93 that identifies a likely root-cause for underperformance by the decision-making logic. The information 93 may be determined by the supervisory system 20 by combining performance assessment with constrained optimization to identify a most likely root-cause of non-compliance with a performance-metric based criterion, as explained in more detail herein.

An operating condition that causes a degradation of the performance of the decision-making logic performance, whether it is currently existent (as indicated by indicator 91) or predicted for a future point in time (as indicated by the forecast time 92) may have various reasons.

For illustration, the performance of the decision-making logic may be deemed to be insufficient for either one of the following, non-exhaustive reasons:
factors that are exogenous to the infrastructure of the power system or industrial system, such as the demand (spatial distribution and/or temporal profile), weather conditions, and/or other external factors;
factors that are resident in the infrastructure of the power system or industrial system; examples include: new transmission and/or distribution lines, new generation and/or storage capacity, new decision-making devices (such as FACTS), topological change due to switching operation(s);

modified decision-making logic of devices (e.g. FACTS, relays, batteries etc.) other than the controller 31 executing the supervised decision-making logic 35;

changes in performance metric (e.g., new grid codes, or new electricity markets rules).

Different techniques that allow the supervisory system 20 to assess performance of a decision-making logic 35 during field operation of the controller 31 and optionally in real time are described below.

Supervisory System 20 Operative to Compare Online Data and Data Used Offline for Generating the Decision-Making Logic The supervisory system 20 may be operative to compare data captured during field operation of the controller 31 (i.e., data that is captured online) with data used (and in particular data generated) when generating the decision-making logic 35. An exemplary configuration will be described with reference to FIGS. 1, 10, and 11.

Information created or otherwise used during the process of generating the decision-making logic 35 may be stored in storage device(s) 40, as illustrated in FIG. 1. The supervisory system 20 is interfaced with the storage device(s) 40 during field operation of the controller 31.

Thus, the following set of data, from the process of generating the decision-making logic 35, is available to the supervisory system 20:

all the models 41 used to perform the various simulations
all the scenarios, test cases (e.g. grid environment, topology) and/or events 42 which were simulated;
the performance 44 of the controller in all simulated cases.

These data are available not only for the decision-making logic 35 which is deployed, but also for the candidate versions of the decision-making logic which were tested during the process of generating the decision-making logic 35.

These data may be used by the supervisory system 20 during field operation of the controller 31. The supervisory system 20 may be operative to compare what is observed during field operation of the controller 31 with the data from the during the process of generating the decision-making logic 35. The supervisory system 20 may be operative to assesses whether the observed reality was taken into account during the during the process of generating the decision-making logic 35, and/or whether the controller 31 behaves as expected during the process of generating the decision-making logic 35. As noted above, there can be various reasons for why the decision-making logic may behave differently from how it is expected to behave, due to factors that may be external to the electric power or industrial system and/or due to factors that may be inherent in the electric power or industrial system. An unsuitable behavior of the decision-making logic might be due to wrong assumptions and/or simplifications made during the process of generating the decision-making logic 35 or to changes in the environment which take place during the lifetime of a controller.

The supervisory system 20 may be operative to observe and assess the following, using operational data captured during field operation of the controller 31 and the pre-operational data stored in the storage device(s) 40:

a) Models: The supervisory system 20 may be operative to assess an accuracy of models used in the process of generating the decision-making logic 35. The supervisory system 20 may be operative to perform real-time model validation, calibration or identification. The supervisory system 20 may be operative to compare observed signals to those expected according to the models used in the process of generating the decision-making logic 35. The supervisory system 20 may be operative to identify a discrepancy between the real-world behavior and the models used in the process of generating the decision-making logic 35. Such a discrepancy, if deemed significant, may indicate that the decision-making logic 35 might need to be modified.

b) Scenarios: The supervisory system 20 may be operative to assess a coverage of the scenarios used in the process of generating the decision-making logic 35. The supervisory system 20 may be operative to compare observed operating points with those used in offline simulations in the process of generating the decision-making logic 35. The comparison can be performed by statistical metrics, such as anomaly detection (detect "anomalies" in the observed operating conditions vis-à-vis the simulated ones) and/or density estimation methods (e.g. k-nearest neighbors, Gaussian processes, principal component analysis, hidden Markov models, neural network such as autoencoders, without being limited thereto).

c) Control actions: The supervisory system 20 may be operative to assess a consistency of control actions for given operating conditions between what is observed during operation and what was simulated in the process of generating the decision-making logic 35. The supervisory system 20 may be operative to create a dataset, during field operation of the controller 31, where each sample consists of the system operating conditions and the controller actions. The supervisory system 20 may be operative to check a similarity of control actions to similar operating conditions between this online dataset and the dataset which was created during in the process of generating the decision-making logic 35. An inconsistency suggests that the decision-making logic 35 needs to be revisited. Alternatively or additionally, the supervisory system 20 can be operative to check the consistency of decisions taken by the decision-making logic 35 during field operation for various similar observed operating conditions.

d) KPI(s): The supervisory system 20 may be operative to assess a consistency of the value of a performance metric for given operating conditions and control actions between what is observed in real-time and what was simulated in the process of generating the decision-making logic 35. An inconsistency suggests that the decision-making logic 35 needs to be revisited.

By performing (a) and (b), the supervisory system 20 is operative to improve its understanding of the environment as compared to the assumptions made in the process of generating the decision-making logic 35. By performing (c) and (d), the supervisory system 20 can be assessing the capability of the decision-making logic 35 of the controller 31 to perform in the real-world environment according to its specifications and/or KPIs. Thus, not all of these functions need to be performed by the supervisory system 20, although all or several of these functions may be combined.

Figure 11:
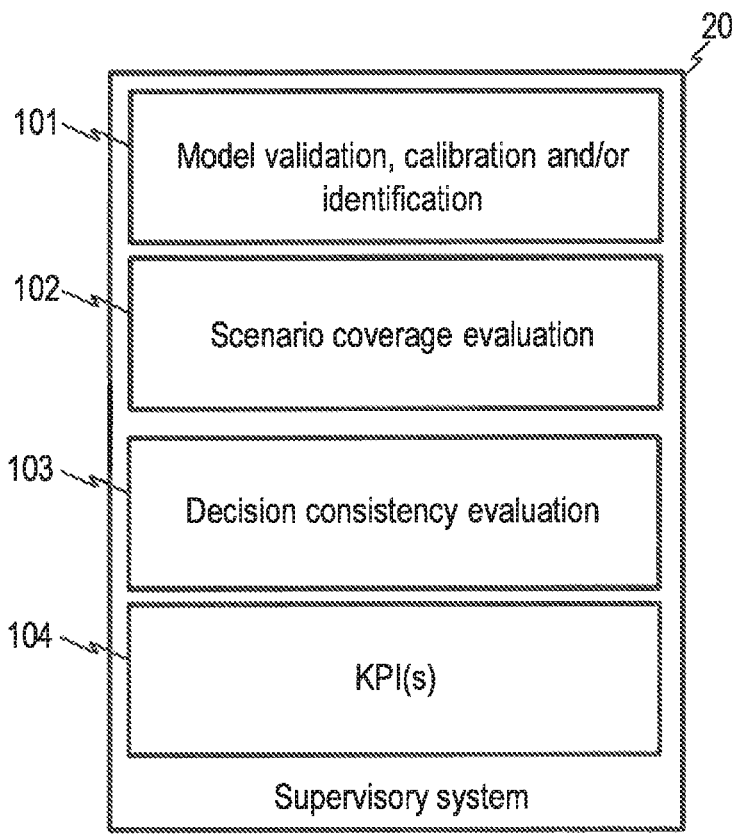
FIG. 11 is a block diagram of a supervisory system.

FIG. 11 is block diagram of a supervisory system 20 according to an embodiment.

One or several IC(s) of the supervisory system 20 may be operative to execute a model module 101 that is operative to validate, calibrate and/or identify model(s) for the controller 31 which executes the decision-making logic 35, for other controllers 32, 33, and/or for other primary or secondary devices in the system.

Alternatively or additionally, one or several IC(s) of the supervisory system 20 may be operative to execute a scenario module 102 that is operative to assess whether scenarios (e.g., operating points) encountered during field operation are significantly different from all scenarios used when generating the decision-making logic 35.

Alternatively or additionally, one or several IC(s) of the supervisory system 20 may be operative to execute a decision evaluation module 103 that is operative to assess whether decisions taken by the decision-making logic 35 during field operation of the controller are consistent with the decisions expected when generating the decision-making logic 35.

Alternatively or additionally, one or several IC(s) of the supervisory system 20 may be operative to execute a KPI module 104 that is operative to assess whether KPIs attained by the decision-making logic 35 during field operation of the controller are consistent with the KPIs expected when generating the decision-making logic 35.

Supervisory System 20 Operative to Execute a Performance Assessment Logic

Alternatively or additionally to accessing the data used when generating the decision-making logic for online performance assessment, the supervisory system 20 may execute a performance assessment logic 27, as shown in FIG. 2.

The performance assessment logic 27 may be trained offline, using the data in the data storage device(s) 40. Execution of the performance assessment logic 27 during field operation of the controller 31 may not require the supervisory system 20 to access the data in the storage device(s) 40, as illustrated in FIG. 2.

The performance assessment logic may be a robustness assessor that assesses operation of the decision-making logic 35.

During field operation of the controller 31, the performance assessment logic 27 may be operative to monitor the power system or industrial system environment of the controller 31. The performance assessment logic 27 may be operative to continually assess whether the observed environment calls for a modification of the decision-making logic 35. The need for modification might be immediate, corresponding to a situation where the decision-making logic 35 is not anymore suitable for the grid environment it operates in, or not immediate but ensuing, corresponding to the identification of an ongoing trend (a progressive change of the environment) which would eventually render the decision-making logic 35 unsuitable.

Monitoring the environment by the performance assessment logic 27 is application-specific. The relevant environment depends on the inputs of the decision-making logic and may, but does not need to be limited to a geographical environment. For illustration, local controllers make decisions based on locally available measurements and central controllers make decisions based on system-wide observability and controls actuators that are throughout the power system. There can be cases, however, where a local controller acts based on input signal coming from remote location(s) in the system or a system-wide control action is initiated based on a local measurement. An example of the first case is the actuation of a FACTS controller for electromechanical oscillation damping (located where it has the most efficient impact) based on remote measurements (located where they provide the best observability.) An example of the second case is congestion alleviation of a line and/or transformer by means of generation re-dispatch. The relevant environment considered by the performance assessment logic 27 is dependent on which quantities affect the operation of the decision-making logic 35 that is being supervised.

The performance assessment logic 27 may be a performance assessment machine learning (ML) model, for example an artificial neural network (ANN). The performance assessment logic 27 may perform a classification task. To this purpose, the output of the performance assessment logic 27 can be a discrete value (e.g., different flags corresponding to red, orange, green) indicating the controller's suitability, or it can be a probability value, indicating how confident the performance assessment logic 27 is that the decision-making logic 35 of the monitored controller 31 needs to be revisited.

In addition to assessing the suitability of the decision-making logic 35 of the controller 31 for the currently observed environment, the performance assessment logic 27 can optionally identify a trend towards expected decrease in performance in the near future (e.g., predicting that the controller will need to be revisited within a certain forecast time, e.g., within the next 1 year).

Alternatively or additionally, the performance assessment logic 27 can be trained such that it provides insight into how the decision-making logic 35 should be improved/modified.

The performance assessment logic 27 is trained using the data in the storage device(s) 40 that was used in a computer-implemented process of generating the decision-making logic 35. This is done prior to field operation of the performance assessment logic 27.

Figure 12:
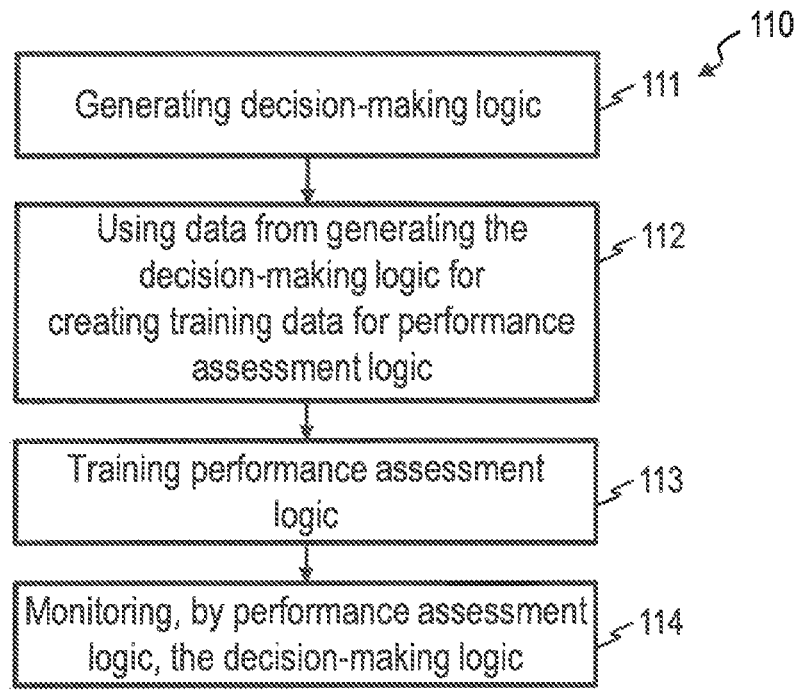
FIG. 12 is flow chart of a method.

FIG. 12 is a flow chart of a method 110.

At step 111, the decision-making logic 35 is generated. This may be done in a computer-implemented process, using machine learning. Data used in the process of generating the decision-making logic 35 is stored as "pre-operational data" in the data storage device(s) 40.

At step 112, the data used in the process of generating the decision-making logic 35 is used to generate the performance assessment logic 27. The data used in the process of generating the decision-making logic 35, and in particular the decision-making logic 35 obtained in that process, may be used to generate training data for training a performance-assessment ML model that is subsequently deployed as the performance assessment logic 27.

At step 113, the performance-assessment ML model that is to be deployed as performance assessment logic 27 is trained. Training data used for training the performance assessment logic 27 may include test scenarios used in the process of generating the decision-making logic 35. The training data used for training the performance assessment logic 27 may include additional test scenarios, which may be based on historical data, expert input, and/or which may be computationally generated.

At step 114, the performance assessment logic 27 is deployed to the supervisory system 20. During field operation, the performance assessment logic 27 monitors the decision-making logic 35.

Techniques for training a performance assessment logic 27 which can monitor performance of the decision-making logic 35 during field operation will be described in more detail. Techniques that allow a performance assessment logic 27 to be trained such that it can be used to provide guidance on how to improve the decision-making logic 35 when required and/or to predict a future operating condition in the system that causes the decision-making logic 35 to underperform will also be described.

The training of the performance assessment logic 27 can use conventional training techniques for a decision-making logic ML model. Such techniques are known to the skilled person, but require appropriate training data. For such a ML to be reliable, and hence of value, the training dataset shall be rich enough, i.e. it shall contain enough representative samples of all cases which the ML model might encounter during operation in the field.

As will be explained in detail with reference to FIGS. 13 to 18, a training dataset used to train the performance assessment ML model that will be deployed as the performance assessment logic 27 can be generated via offline simulations. Here, the term "simulation" should be interpreted in a general sense, encompassing any one or any combination of: (i) numeric simulations in time and/or frequency domain (e.g. power flow, short-circuit calculations, electromagnetic transients), (ii) solution of an optimization problem (e.g. optimal power flow, unit commitment) or (iii) other computations which allows the creation of scenarios that can challenge the decision-making logic.

The training data used to train the performance assessment ML model that will be deployed as performance assessment logic 27 may include a first training dataset that was used when generating the decision-making logic and an additional training dataset that includes scenarios not included in the first training dataset.

Figure 13:
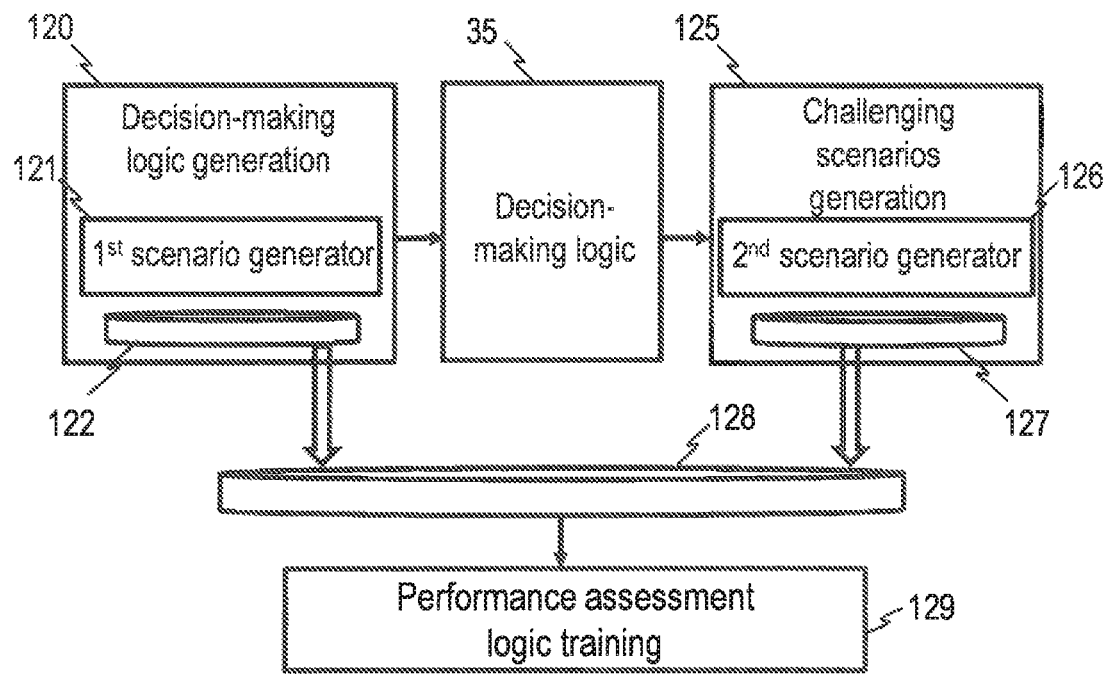
FIG. 13 is signal flow chart illustrating training of a performance assessment logic.

FIG. 13 is a schematic diagram illustrating the generating of the training data used to train the ML model that will be deployed as performance assessment logic 27.

A decision-making logic generator 120 may be operative to generate the decision-making logic 35, using a first training dataset. The decision-making logic generator 120 may include a first scenario generator 121 that may generate at least a part of the first training dataset. The first training dataset may include additional training data, such as historical scenarios and/or scenarios specified by a human expert.

The first training dataset includes a first set of test scenarios, which may be stored in a first historian database 122.

For illustration only, the first scenario generator 121 may be a ML model that challenges another ML model that is trained to become the decision-making logic 35. The first scenario generator 121 and the other ML model that is trained to create the decision-making logic 35 may be two ML models that operate against each other. The first scenario generator 121 and the other ML model that is trained to create the decision-making logic 35 may be the generator and discriminator networks of a GAN.

The result of the process performed by the decision-making logic generator 120 is the decision-making logic 35.

A challenging scenarios generation module 125 is responsible for generating additional training data for training the ML model that will be deployed as the performance assessment logic 27. The challenging scenarios generation module 125 may include a second scenario generator 126. The second scenario generator 126 may be a ML model (e.g., an ANN) that challenges the decision-making logic 35. Note that the decision-making logic 35 is no longer modified as the second scenario generator 126 generates scenarios that make the decision-making logic 35 perform poorly. As will be explained below, various techniques may be used to ensure that the second scenario generator 126 can generate scenarios that make the decision-making logic 35 perform poorly.

For illustration, the second scenario generator 126 may be specifically set up in such a way that it generates scenarios that our outside the specification of the decision-making logic 35, in order to allow the performance assessment logic 27, when trained, to assess the performance of the decision-making logic 35 in situations outside of its specification.

The second scenario generator 126 may generate additional training data that includes scenarios outside the specification of the decision-making logic 35. This additional training data may be stored in a historian database 127. A majority of the scenarios included in the additional training data may be outside the specification of the decision-making logic 35.

The first training data used for generating the decision-making logic 35 may be combined with the additional training data stored in the historian database 127, to thereby generate a larger, second training dataset 128.

This second training dataset 128 includes a first training dataset that was used when generating the decision-making logic and an additional training dataset that includes scenarios not included in the first training dataset. This second training dataset 128 is used for training 129 the performance assessment logic.

The decision logic generator 120, the challenging scenarios generation module 125, and the performance assessment logic training 129 may be performed by one or several IC(s) of a computer, server, or distributed computing infrastructure.

The data in the first and second training dataset is respectively labeled data, with the labels being based on a performance evaluation that is performed by the decision logic generator 120 and the challenging scenario generation module 125.

Thus, to train a well-performing performance assessment logic 27, the autonomous decision-logic generator 120 is complemented by a subsystem 125 that is operative to generate additional data which were not needed for generating the decision-making logic 35 itself, but which are used for training the performance assessment logic 27.

Hence, as explained in more detail with reference to FIGS. 14 to 18, the required second training dataset 128 is obtained from two sources:

a. Scenarios that were created by a second scenario generator 126 that challenges the decision-making logic 35 prior to its field operation and that were evaluated with regard to decision-making logic performance.

b. Scenarios that were created by the first scenario generator 121 in the process of generating the decision-making logic 35.

As explained in detail below, the data mentioned in item (a) ensures that the second training dataset 128 contains scenarios that make the decision-making logic 35 underperform, while the data mentioned in item (b) ensures that the second training dataset 128 contains scenarios corresponding to an appropriate performance of the decision-making logic 35.

Challenging Scenario Generation

The decision-making logic 35 may be generated by an adversarial logic in which the first scenario generator 121 is the adversary that challenges the decision-making logic that is being trained. The first scenario generator 121 may feed a simulation system with the scenarios for which the performance of the decision-making logic 35 is assessed during training of the decision-making logic. The role of the first scenario generator 121 is to challenge the decision-making logic 35 that may be autonomously created by a control logic generator subsystem. Thereby, the process of generating the decision-making logic 35 is driven to a well-performing decision-making logic 35.

A successful first scenario generator 121 generates two classes of scenarios: a) scenarios covering what the decision-making logic 35 is expected to be regularly facing (e.g.

scenarios corresponding to normal power system operation), and, b) seldomly occurring, but challenging, scenarios against which the decision-making logic 35 should be robust. The deployed decision-making logic 35 needs to perform well against both scenario types.

Building upon such a process of automatically generating the decision-making logic 35 using an adversarial logic, the performance assessment logic 27 can be generated in a computer-implemented manner, prior to field operation of the decision-making logic 35.

In order to create the data required for the providing the performance assessment logic 27, a second scenario generating subsystem, called the challenging-scenario generation system 125, is utilized. The objective of this challenging-scenario generation system 125 is to identify scenarios which challenge the performance of the decision-making logic 35. The scenarios generated by the second scenario generator 126 that successfully challenge the decision-making logic 35 are used, together with other data, to train the performance assessment logic 27 prior to its field operation.

The difference between the second scenario generator 126 and the first scenario generator 121 is that the first scenario generator 121 is operative to generate legitimate scenarios only, scenarios against which the designed decision-making logic 35 should perform in an appropriate manner as it is expected to face such scenarios in operation. The first scenario generator 121 may be operative to generate only scenarios that are within the specification of the system in which the controller 31 is used.

The output of the second scenario generator 126 includes scenarios beyond the legitimate scenario space, i.e. scenarios that do not need to be considered when designing a well-performing decision-making logic 35. The second scenario generator 126 may be operative to generate (at least also) scenarios that are not within the specification of the system in which the controller 31 is used.

The role of the second scenario generator 126 is to identify potential future scenarios which, if ever materialized, would lead to an underperforming decision-making logic 35.

Such potential future scenarios may be caused by changes in system topology, changes in system hardware, and/or changes in functionality of primary or secondary devices of the electric power system or industrial system.

For illustration, if the decision-making logic 35 under design is a controller of a STATCOM, the second scenario generator 126 may create scenarios which correspond to the presence of another power-electronics-based device (e.g. another STATCOM of SVC) in the STATCOM's electrical vicinity, without such a device being actually (or planned to be) installed there. Such scenarios are not even created by the first scenario generator 121, since they are not part of the STATCOM controller's specifications.

Figure 14:
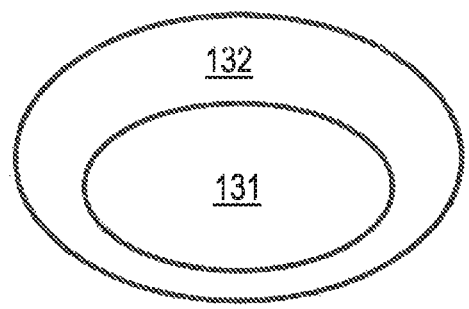
FIG. 14 is a diagram showing a training scenario space.

FIG. 14 schematically illustrates a scenario space. A first set of scenarios 131 is used to train the decision-making logic 35. The first set of scenarios 131 may be generated by the first scenario generator 121 or may include scenarios generated by the first scenario generator 121. The first set of scenarios 131 may consist entirely of scenarios within the specifications of the system in which the decision-making logic 35 is deployed, at the time of deployment of the decision-making logic 35.

A second set of scenarios 132 is specifically set up so as to successfully challenge the decision-making logic 35. The second set of scenarios 132 may be generated by the second scenario generator 126 or may include scenarios generated by the second scenario generator 126. The second set of scenarios 132 may include or may consist entirely of scenarios outside the specifications of the system in which the decision-making logic 35 is deployed, at the time of deployment of the decision-making logic 35.

The sets 131 and 132 may be merged to form a merged set that is then used for training the performance assessment logic 27.

Figure 15:
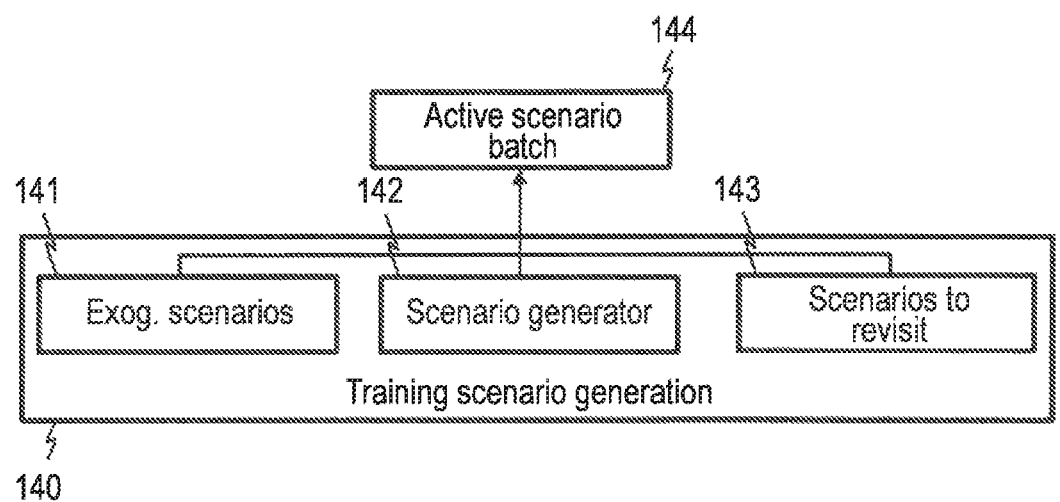
FIG. 15 is a diagram illustrating scenario generation for training a decision-making logic or for training a performance assessment logic.

FIG. 15 illustrates a configuration of a scenario generation system that may be used in an embodiment. The general configuration of FIG. 15 may be used both for generating the first set of scenarios 131 and the second set of scenarios 132, when some adaptations are made that will be described with reference to FIGS. 16A and 16B.

A training scenario generation module 140 may include a repository of exogeneous scenarios 141. The exogeneous scenarios 141 may include historical scenarios, may be based on historical scenarios, or may include scenarios specified by a human expert.

The training scenario generation module 140 may include a scenario generator 142 which generates new scenarios. The scenario generator 142 may be an adversarial ML model that challenges a decision-making logic 35 during training of the decision-making logic 35 (in the process of generating the decision-making logic) or after training of the decision-making logic 35 has been completed (to generate additional scenarios for training the performance assessment logic 27).

The scenario generator 142 may be a ML model that is updated during its operation, with the goal of improving the scenario generator 142 in its function of challenging the decision-making logic.

The training scenario generation module 140 may include a repository of challenging scenarios 143. The challenging scenarios 143 may include scenarios that were identified to be challenging for the decision-making logic 35.

Scenarios may be selected from the three sources 141, 142, 143 and may be fed to a simulation system. A batch 144 of active scenarios may be maintained.

Initially, the scenarios will by selected from the exogeneous scenarios 141.

During the process of training the decision-making logic (and the scenario generator 142, which is an adversarial logic to a logic that improves the decision-making logic), more scenarios created by the scenario generator 142 are selected in order to challenge the decision-making logic 35 that is currently being trained.

During the design process, challenging scenarios 143 which triggered an update of the decision-making logic 35 can be recorded. Those scenarios to revisit can be intermittently selected to ensure that as the decision-making logic 35 is evolving it is still able to tackle previously identified challenging scenarios.

The selection from the database of scenarios to revisit 143 may be done in various ways. For illustration, the scenario generation module 140 may be trained to learn which scenarios are the most likely to influence the decision-making logic 35.

The role of the scenario generator 121, 126, 142 is to challenge the active decision-making logic 35, i.e., to identify scenarios which will make the decision-making logic 35 underperform. The output of the scenario generator 121, 126, 142 are values assigned to all the parameters which define a scenario, such as demand and generation levels/patterns, contingencies, faults, topology etc. Such a set of parameters can be referred to as scenario vector.

Figure 18:
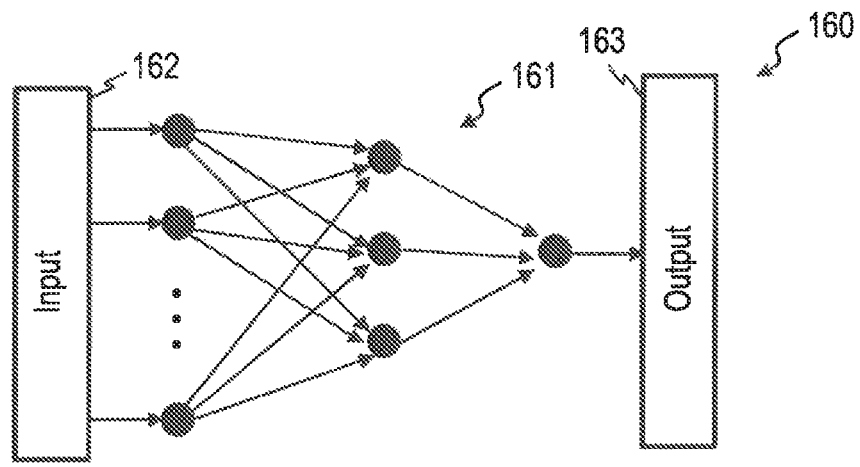
FIG. 18 is a diagram of a machine learning model implementation of a performance assessment logic.

A ML model, such as an ANN, may be adopted to generate scenario vectors, as shown in FIG. 18. This model can be referred to as scenario-generating ML model. Its output (i.e. the scenario vectors) can continually, such that it generates usefully challenging scenarios. This may be done in various ways.

The scenario-generating ML model may work as a (possibly stochastic) function mapping from an input containing at least a description of the current decision-making logic 35 to a scenario vector. The scenario-generating ML model is learned during the process of generating the decision-making logic such that the generated scenario will be a challenging one where the decision-making logic 35 predictably shows low performance. The scenario-generating model, which described by its architecture and the parameter values (such as weights of links between nodes or other parameters of activation functions), will be trained by making use of previously simulated scenarios and the corresponding performance of the decision-making logic, as part of the autonomous design process. An objective of the training process is to attain convergence to a scenario-generating ML model which can create challenging scenarios for a given decision-making logic 35. It is expected that the parameter values defining the scenario-generating ML model change faster at the beginning of the iterative process.

Alternatively, the scenario-generating ML model may be continually updated (e.g. the ANN weights are continually changing from one iteration to the next). This approach does not aim at converging to a set of parameters. The parameters will be continually changing such that, at every iteration, the scenario-generating ML model is creating usefully challenging scenarios.

A pre-selected, relatively small, input vector can be used for the scenario-generating ML model. This input vector can be static (i.e. constant) or randomly varying (within a statistical distribution). For instance, if the scenario-generating ML model is an ANN, the way this input vector is transformed through the ANN internal operations and hidden layers into a scenario vector at the ANN output layer will be changing as the ANN weights are being updated.

The architecture of the scenario-generating ML model (as well as the input vector, if required) can be provided by a human engineer or may be automatically identified during the design process.

Figure 16A:
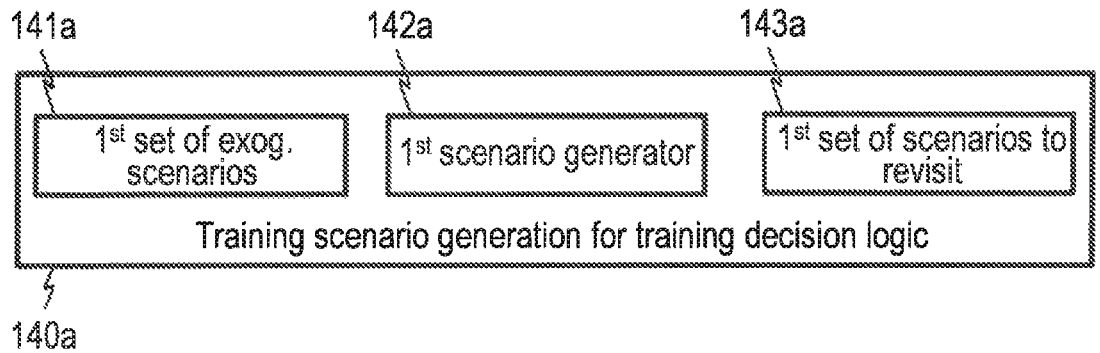
FIG. 16A is a diagram illustrating scenario generation for training a decision-making logic.
Figure 16B:
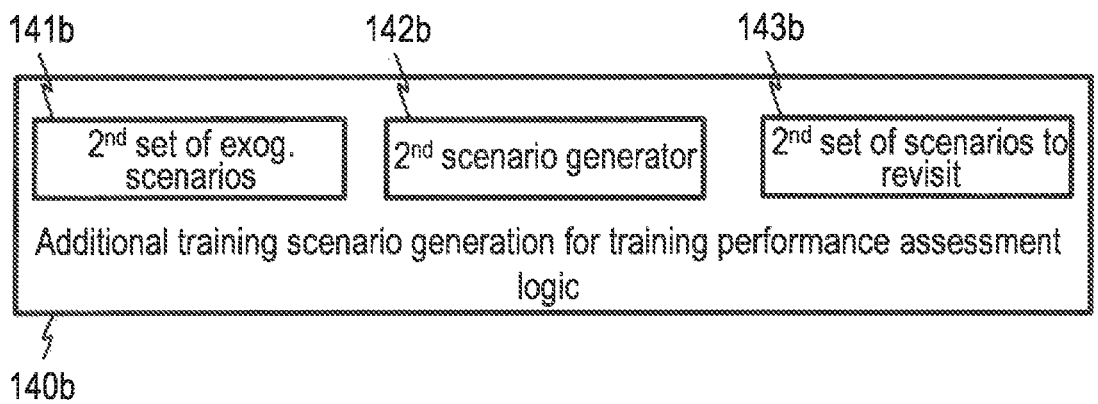
FIG. 16B is a diagram illustrating scenario generation for training a performance assessment logic.

FIG. 16A shows a training scenario generation module 140a that can be used in the process of generating the decision-making logic 35, and FIG. 16B shows a training scenario generation module 140b that can be used in the process of generating additional scenarios that are used for training the performance assessment logic 27. The scenario generation modules 140a, 140b may have the same general configuration, as described above, and may include a repository of exogeneous scenarios 141a, 141b, a ML model that automatically generated new scenarios 142a, 142b, and a repository of scenarios to be revisited 143a, 143b (which is optional).

In order to allow the training scenario generation module 140b to generate scenarios which are outside the specifications of the decision-making logic (contrary to the scenario generation module 140a, which creates scenarios that lie within the specifications), the following may be used:

The second set of exogenous scenarios 141b may be selected by an engineer such that it contains a potential future scenarios which are outside the system specifications. The potential future scenarios may be based on possible future changes of system topology (such as the installation of new transmission or distribution lines, new transformers etc.), possible future changes to device capabilities (such as possible updated to existing circuit breakers, protection relays, etc.), or other possible future changes.

Alternatively or additionally, when training the ML model which is the second scenario generator 142b, a penalty may be assigned to outputs of the second scenario generator 142b, which consist of "legitimate" scenario vectors. In this way, as the second scenario generator 142b becomes increasingly better trained during the iterations, it will progressively produce scenario vectors that are only corresponding to potential future scenarios.

The second scenario generator 142b may be used as second scenario generator 126 in the system of FIG. 13.

Figure 17:
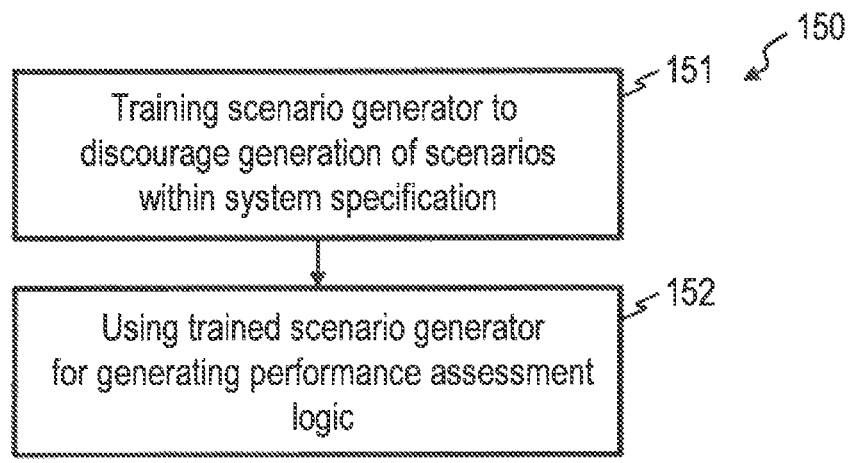
FIG. 17 is flow chart of a method.

FIG. 17 is a flow chart of a method 150. The method 150 may be used to generate a second set of training scenarios 132 that goes beyond the first set of training scenarios 131 and that can be used for training the performance assessment logic. The method 150 is performed prior to field operation of the performance assessment logic 27. The method 150 may be performed prior to field operation of the decision-making logic 35.

At step 151, the second scenario generator 142b may be trained to challenge the decision-making logic 35. In the process of training the second scenario generator 142b, the second scenario generator 142b is trained so as to encourage the generation of scenarios that are not within the system specifications of the decision-making logic.

For illustration, the second scenario generator 142b may be a ML model (such as an ANN). The following steps may be iteratively performed:

generating, by the second scenario generator 142b, a scenario for challenging the decision-making logic 35;

providing the generated scenario to a simulation system that simulates the decision of the decision-making logic 35 and the response of the electric power system or industrial system in response to the scenario;

evaluating the second scenario generator 142b, taking into account both how well or poorly the decision-making logic 35 addressed the scenario and whether the scenario is within the system specifications; and modifying the ML model that forms the second scenario generator 142b based on a result of the evaluating.

The evaluation step may evaluate the performance of the decision-making logic 35 in accordance with one or several KPIs. The overall evaluation result may be a combination of the performance of the decision-making logic 35 determined in accordance with one or several KPIs and a penalty that is selectively imposed if the scenario is found to be within the system specification.

Modifying the ML model may include modifying parameters of activation functions, without being limited thereto.

FIG. 18 is a schematic representation of a ML model 160 which may be implemented as an ANN and which may be trained as the second scenario generator 126, 142b. The ML model 160 may include nodes 161 in a number of layers, with activation functions being modified iteratively to improve the performance of the ML model 160. Responsive to input 162, the ML model 160 generated an output 163. As explained above, the ML model 160 is trained in such a way that it also produces scenarios that are not within the specification of the decision-making logic 35, as used in the electric power system or industrial system. This input 162 can be static (i.e. constant) or randomly varying (within a statistical distribution). The output 163 may be a set of all parameter values required to define the operating scenario.

Training the Performance Assessment Logic

Returning to FIGS. 13 and 14, the decision-logic generation system 120 includes the first scenario generator 121 that competes against another subsystem for generating the decision-making logic 35 during an autonomous, computer-implemented process. This adversarial logic simultaneously improves both the logic that generates the decision-making logic 35 and the first scenario generator 121 (which may act as creator and discriminator of a GAN, for example). The autonomous, computer-driven generation of a well-performing and robust decision-making logic 35 is ensured thereby. The first scenario generator 121 is itself trained as part of the autonomous design process.

The final decision-making logic 35 of the design process, to which the process of generating the decision-making logic 35 converges, is deployed to the controller 31.

The training of the second scenario generator 126 and, hence, generation of additional training data for the performance assessment logic 27 may start when the decision-making logic 35 design process has converged to the final decision-making logic 35 that is to be deployed.

The second scenario generator 126 is trained to iteratively evolve towards being capable of identifying new potential future scenarios that are increasingly challenging for the final decision-making logic 35. The second scenario generator 126 may be operative to generate the data which are required for providing increasingly challenging scenarios outside the current system specification of the electric power or industrial system by competing against final decision-making logic 35 in an iterative manner.

This eventually leads to a well-performing second scenario generator 126, able to generate scenarios which make the final decision-making logic 35 perform poorly.

As illustrated in FIG. 18, the architecture of the Challenging-Scenario Generator (such as the topology of an ANN) and its associated parameters (such as weights between nodes of an ANN) may be continually updated during the data-generation process, which is driven by the second scenario generator 126 itself.

The performance of the second scenario generator 126 may be assessed automatically. A potential future scenario is deemed as good when the final decision-making logic 35 performs poorly according to suitable metric(s). Additionally, as has been explained above, the performance of the second scenario generator 126 is assessed to be poor when the output scenario is within the specifications of the decision-making logic 35 as used in the electric power system or industrial system.

In that way, the second scenario generator 126 progressively learns to identify challenging potential future scenarios.

Training or learning the second scenario generator 126 is an iterative process. In each generation, ANN weights can be updated. This may be performed by utilizing gradients of some output criterion of the ANN with respect to the ANN weights. The gradients are used in a (stochastic) gradient descent, applied to batches of the training data. For instance, in a supervised learning setup, the output criterion is an output error, that is a difference between what the ANN gave as output in the simulation and what that output should have ideally been, hereafter referred to as "right ANN output" (for instance a "ground truth"). This "right ANN output" serves as a supervised learning signal.

It may not be possible to provide a supervised learning signal. In the absence of an ANN output error, methods to guide the ANN training (i.e. updating the values of its weights) based on a value of a performance metric can be used. Various parameter search methods can be used, including trial-and-error search methods such as evolutionary and genetic algorithms, hill-climbing, simulated annealing, and other heuristics, and/or model-based search techniques In the case of ANN training, the parameters that are updated can correspond to the ANN weights.

An input to the ANN training process is a "learning rate", which corresponds to the impact that the last training sample has on the update of the ANN weights. The higher the learning rate is, the more the ANN weights are modified according to the gradients computed by the latest (set of) sample(s).

The learning rate can be dynamically modified during as the second scenario generator 126 is trained, so that the ANN moves faster away from solutions which do not perform well by using a large learning rate, or the ANN training spends more iterations to further improve seemingly well-performing solutions by using a small learning rate.

Furthermore, with the decision-making logic 35 being fixed when the second scenario generator 126 is trained, scenarios which can challenge the currently effective control logic can be efficiently identified.

Evolution of the active ANN performance may be automatically monitored, with the ANN performance of the second scenario generator 126 being the performance for challenging the decision-making logic 35. A decision on when an ANN having a different topology is to be selected may be automatically taken. For illustration, a training cycle in which an ANN having a given architecture is updated can be stopped when the ANN performance is not considerably improving anymore, or if the active ANN architecture seems unable to reach a desirable performance level, and a different ANN architecture may be automatically selected (e.g., from a set of pre-defined candidate ANN architectures).

At the end of a training cycle, the trained ANN is optionally stored in a historian, and a new architecture is selected by using a new set of hyperparameter values.

The process terminates according to a termination criterion (e.g. convergence to a sufficiently good performance metric, maximum number of training cycles reached etc.) and the best architecture is chosen from the historian for use as the second scenario generator 126.

The process of training the second scenario generator 126 does not modify the decision-making logic 35, which has been finalized for deployment.

A first dataset 122, 131 of labeled data is generated during the process of generating the decision-making logic 35. These data contain scenarios 131 for which the deployed decision-making logic 35 performs well. Only cases corresponding to the final decision-making logic 35 should be utilized from the repository 122.

A second dataset 127, 132 includes labeled data, with each sample consisting of a simulated potential future scenario labeled by the corresponding performance of the decision-making logic 35. In general, this dataset contains samples corresponding to scenarios for which the decision-making logic 35 performed well and others for which it performed unacceptably or alarmingly poorly.

These two datasets are merged into one. The merged dataset is used to train the performance assessment logic 27. The result of this training is an ML model, which receives raw or processed system observables as input and provides the estimated controller performance as output. This ML model is referred to as performance-assessment ML model.

In order to train such a performance-assessment ML model, the training dataset needs to take an appropriate format. For example, if the performance is chosen to be treated as a binary classification, then all samples should be labeled by two flags, say "1" if the corresponding performance metric is above a certain value (judged as "acceptably good") and "0" otherwise.

Out of all the attributes which define a scenario vector, only a subset can be used as input attributes for the performance-assessment ML model, namely those that can be observed by the performance assessment logic 27 in subsequent field use. These attributes are also referred to as "scenario signatures" herein. A scenario signature corresponds to the best possible grid system observability which can be achieved, relevant for a given decision-making logic 35. A by-product of the training of the performance assessment logic 27 is that the corresponding performance-assessment ANN (or other performance-assessment ML model) to which the training converges is the one that extracts the maximum possible information regarding the controller's performance out of the scenario signatures.

For example, while, for a decision-making logic assessment, the most relevant scenario attributes might be the exact control decisions of newly installed power-electronics-interfaced devices, the performance assessment logic 27 can be trained to assess the decision-making logic 35 based solely on the locally measured voltages and currents, as the former attributes might not be available to the performance assessment logic 27 while in operation. However, these attributes can and shall be part of the scenario space searched by the second scenario generator 126 during the data generation phase.

With labeled data being available for training the performance assessment logic 27, supervised machine learning techniques may be used. Similarly to what has been explained above, training the performance assessment logic 27 may be an iterative process, including:

- selecting a performance-assessment ANN architecture (which may be defined by hyperparameters);
- adjusting parameters of the selected performance-assessment ANN architecture to improve the selected performance-assessment ANN for the task of classifying the decision-making logic performance;
- if no further improved is attainable by continued training performance-assessment ANN architecture, storing the performance-assessment ANN architecture, the parameters that result in the best performance of the performance-assessment ANN for the task of classifying the decision-making logic performance, and the associated rate of correct classifications in a historian, selecting another performance-assessment ANN architecture (e.g., by modifying the hyperparameters, which may affect the number of layers and/or nodes), and repeating the preceding step for the new performance-assessment ANN architecture;
- if a termination criterion is fulfilled, deploying the best-performing performance-assessment ANN as the performance assessment logic 27.

Field Operation of the Performance Assessment Logic 27:

Once the performance assessment logic 27 is trained and the required observable quantities (i.e. the scenario signatures) are defined, the performance assessment logic 27 may be used by the supervisory system 20 to analyze performance of the deployed-decision-making logic 35 based on the scenarios signatures captured during field operation.

Whenever the performance assessment logic 27 estimates that the system topology and/or operating conditions have changed such that the decision-making logic does not meet a desired performance criterion, an output may be generated. The output may include an alarm, warning, or other output for outputting via an HMI. Alternatively or additionally, the output may automatically trigger a control action, such as activation of a protection function, scheduling down-times, triggering personnel deployment, and/or initiating a modification of the decision-making logic 35.

Detecting Trends of Performance Deterioration

The supervisory system 20 may be operative to detect trends in performance deterioration. The supervisory system 20 may be operative to provide prognostic information. For illustration, the supervisory system 20 may be operative to determine and output a forecast time at which the decision-making logic 35 is expected to need revision. I.e., in addition to operating as a classifier labelling the presently observed performance, the performance assessment logic 27 may be operative to identify a trend towards a condition in which the decision-making logic 35 is deemed to be underperforming. For example, a "trend" might be an increasing penetration of converter-interfaced distributed energy resources in a region. Various techniques may be used to allow the supervisory system 20 to detect such a trend.

Training the Performance Assessment Logic to Identify Trends

When the performance assessment logic 27 is used, it may be trained so as to identify a trend toward a scenario in which the decision-making logic 35 is underperforming. As explained above, the performance assessment logic 27 may be generated by training a performance-assessment ML model.

In order to allow trends to be detected, the second scenario generator 126 may be operative to create batches of scenarios, where each batch is driven by an evolution of a latent variable, which represents the trend. Each such batch of scenarios will be a time-series, corresponding to the simulated progressive evolution of the trend over time.

Such latent variables can be explicitly defined by a human engineer before starting the autonomous process of generating the performance assessment logic 27. Each trend may be denoted by a variable in the scenario vector which is modified by the second scenario generator 126 to generate new scenarios. The latent variable(s) may be associated with the actual variables defining a scenario in a deterministic or stochastic way. For example, if a latent variable is the total electricity demand in a region, then increasing its value could correspond to accordingly increasing the demand profile of each individual consumer.

By training the performance-assessment ML model, in the process of generating the performance assessment logic 27, using batches of scenarios driven by the evolution of a latent variable, the performance assessment logic 27 can be trained so that it implicitly recognizes the evolution of a trend, which might lead to future poor controller performance.

The performance assessment logic 27 may generate a predictive output (e.g., alarm, warning, or other output) indicating an expected future condition in which the decision-making logic 35 may be underperforming.

Figure 19:
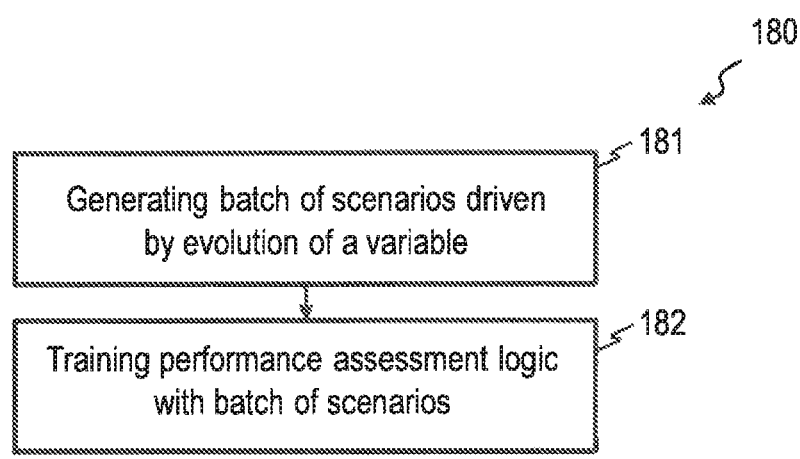
FIG. 19 is flow chart of a method.

FIG. 19 is a flow chart of a method 180. The method 180 may be used prior to field operation of the performance assessment logic 27 and optionally prior to field operation of the decision-making logic 35, in order to generate the performance assessment logic 27 such that it can detect trends towards situations in which the decision-making logic 35 underperforms.

At step 181, a batch of scenarios is automatically generated as a time-series, with the evolution within the batch being driven by the evolution of a variable. The variable may be one of the parameters defining a scenario. Not only one, but plural such batches may be generated.

At step 182, the performance assessment logic is trained using training data that includes the batches of scenarios.

Figure 20:
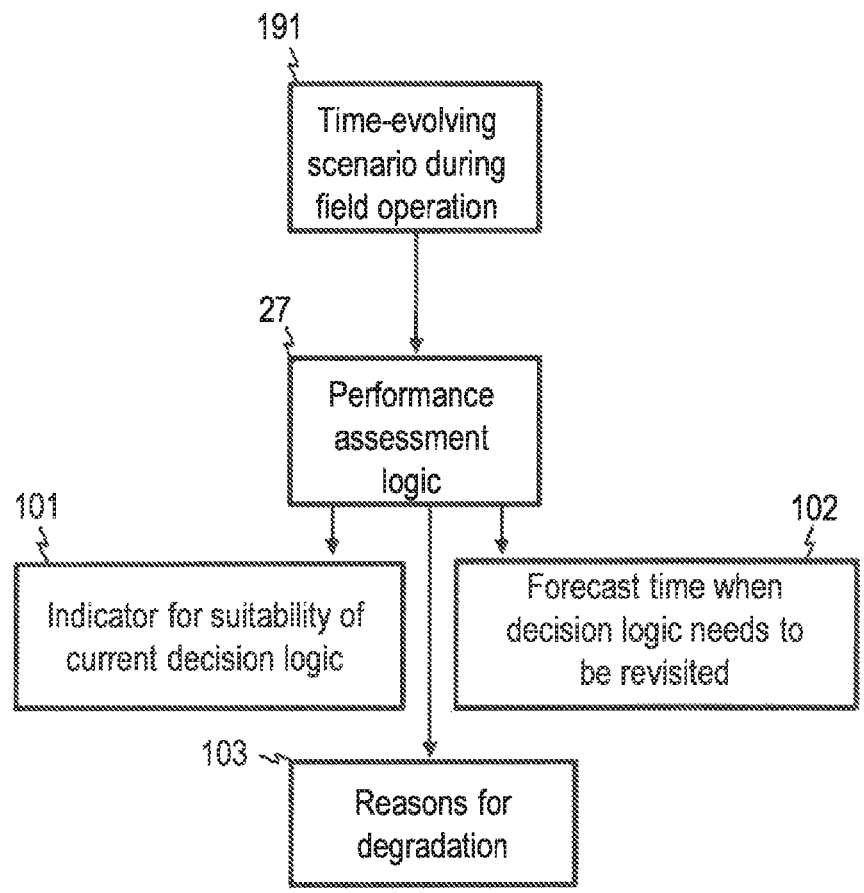
FIG. 20 is a diagram illustrating operation of a supervisory system.

FIG. 20 is a block diagram illustrating operation of the performance assessment logic 27. The performance assessment logic 27 receives as inputs parameters that define scenarios during field operation of the controller 31.

The performance assessment logic 27 operates as a classifier, generating an output 101 indicating the suitability of the decision-making logic 35 for the present electric power system topology and operating conditions.

The performance assessment logic 27 operates as a predictive logic, generating a forecast output 102 indicating that the electric power system or industrial system is expected to evolve towards a condition in which the decision-making logic 35 underperforms.

The performance assessment logic 27 may optionally be operative to output information 103 that indicates possible root-causes for poor performance of the decision-making logic 35, as will be explained with reference to FIGS. 24 to 27.

Using Predictor(s)

In order to allow trends of performance deterioration to be detected, the supervisory system 20 may use the performance assessment logic 27 in combination with at least one predictor, i.e. a model which performs a forecast of the evolution of the monitored system. Recurrent Neural Networks can be utilized in order to create a data-based predictor. This forecast can be provided as input to the performance assessment logic 27, which will then assess the performance of the decision-making logic under the predicted future system conditions. Depending on what the predictor forecasts (e.g. future electricity demand, or future penetration of distributed renewables), the performance assessment logic 27 is trained such that it can receive and process the predicted quantity as input.

Figure 21:
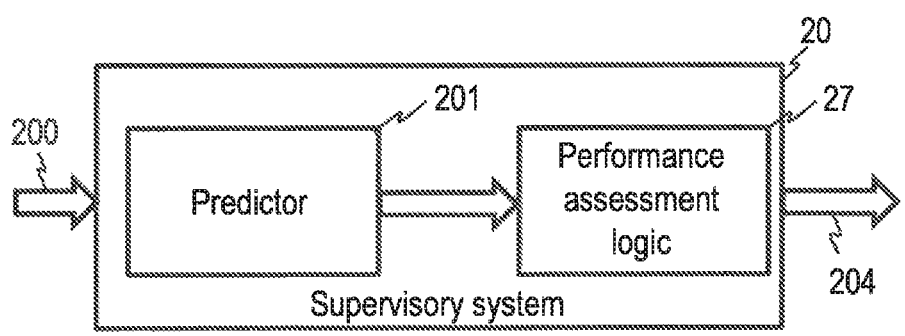
FIG. 21 is a diagram illustrating operation of a supervisory system.

FIG. 21 is a block diagram of a supervisory system 20. The supervisory system 20 includes one or several IC(s) that execute a predictor 201 and a performance assessment logic 27. The supervisory system 20 receives scenario signatures as input 200.

At least one of the scenario signatures is fed to the predictor 201, which computes a predicted future system parameter (e.g., future electricity demand, or future penetration of distributed renewables). The performance assessment logic 27 processes the predicted future system parameter, typically in combination with other scenario signatures in the input 200, to determine whether the decision-making logic 35 has acceptable performance at the future point(s) in time to which the forecast(s) computed by the predictor 201 relate.

Figure 22:
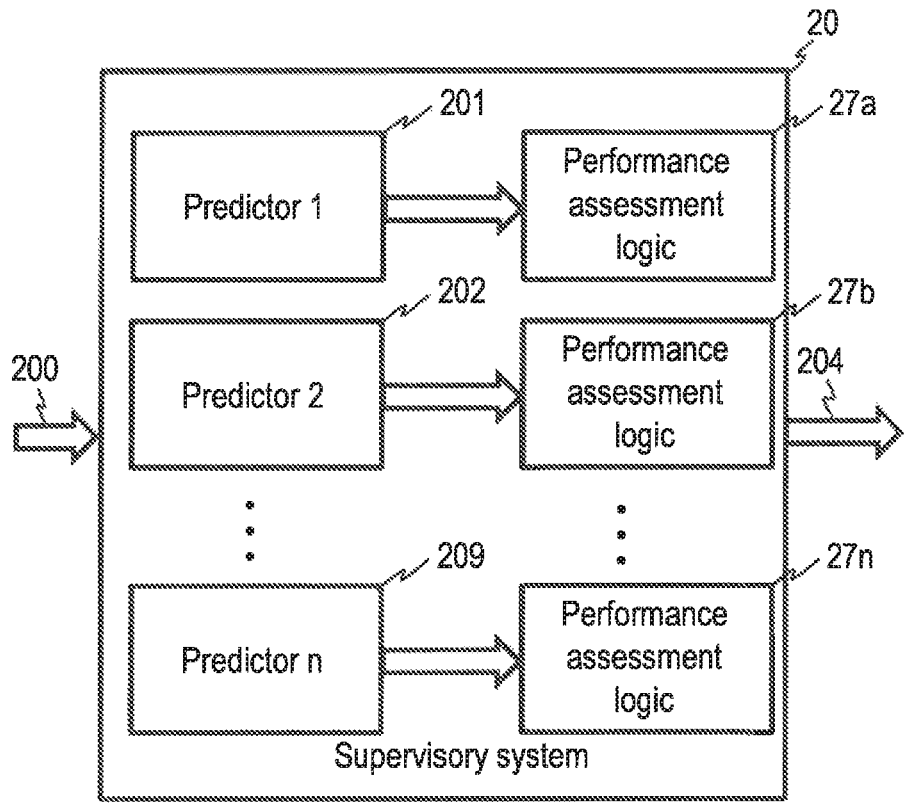
FIG. 22 is a diagram illustrating operation of a supervisory system.

FIG. 22 illustrates a supervisory system which includes one or several IC(s) that execute several predictors 201-209 and several instances of the performance assessment logic 27a-n.

The different predictors 201-209 can be used to predict the system parameter (e.g., future electricity demand, or future penetration of distributed renewables) at various future points in time (e.g., a first predictor 201 may provide a forecast for a first future point in time, and a second predictor 202 may provide a forecast for a second future point in time different from the first future point in time). Alternatively or additionally, a same predictor can be used recurrently until it reaches a specific future point in time, as shown in FIG. 21.

For any of these predictions a forecast scenario signature will be generated by the predictor(s), and the forecast performance of the decision-making logic is analysed given current trend(s).

Irrespective of which technique is used for predictive identification of possible future system conditions that cause the decision-making logic 35 to underperform, the obtained estimates can result in early warnings to a human expert about the potential performance of the decision-making logic 35 in the future (e.g. given the current trends the control-logic performance will become alarming in 2 years' time. Such early warnings can be periodically updated when new predictions are performed.

Figure 23:
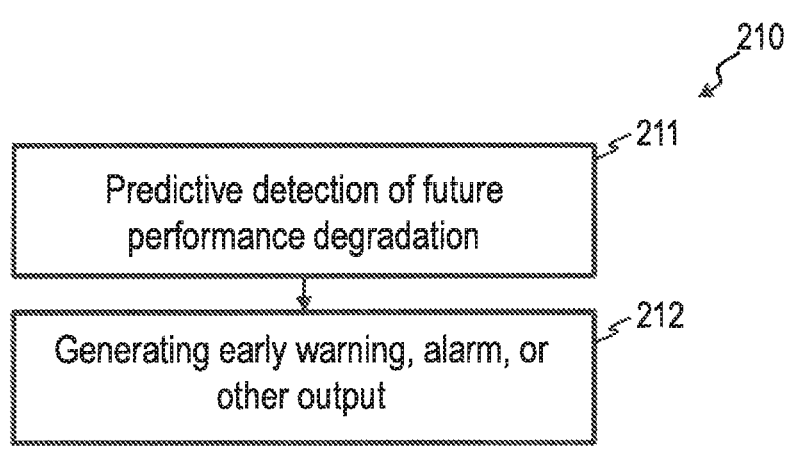
FIG. 23 is flow chart of a method.

FIG. 23 is a flow chart of a method 210 which can be automatically performed by the supervisory system 20 during field operation.

At step 211, a forecast change in the electric system or industrial system may be identified, which may cause the decision-making logic 35 to underperform. This may be done using any one of the techniques described above, e.g., by training the performance assessment logic 27 using time-series evolution of scenarios and/or by using one or several predictor(s) that provide input(s) to the performance assessment logic 27.

At step 212, an early warning, alarm, or other output may be generated. The early warning, alarm or other output may be output via an HMI. Alternatively or additionally, the supervisory system 20 may automatically trigger the decision logic generator 120 to generate a modified decision-making logic 35.

Providing Insights on the Root-Causes

The supervisory system 20 may be operative to provide insights on what root-causes (or reasons) for any observed deterioration of the suitability of a monitored controller 31 might be.

Identifying a potential root-cause of the observed performance deterioration corresponds to identifying a scenario signature input (i.e., one of the system observables received as input by the supervisory system 20) that is likely to be responsible for a system condition which causes the decision-making logic 35 to perform poorly. This might be one single scenario signature, or a combination of several scenario signatures.

It is recalled that the term "scenario signature" refers to a parameter of the electric power system or industrial system that is received and processed by the supervisory system 20 during field operation.

The supervisory system 20 may be operative to identify the one of its inputs which would need to be modified to cause the decision-making logic 35 to meet a performance-metric based criterion (e.g., to have a performance determined according to the performance metric that exceeds a threshold). The supervisory system 20 may be operative to identify the one of its inputs for which minimum modification is required to cause the decision-making logic 35 to meet the performance-metric based criterion. The supervisory system 20 may be operative to output information on the identified system parameter(s), which result in the decision-making logic 35 to be underperforming.

Figure 24:
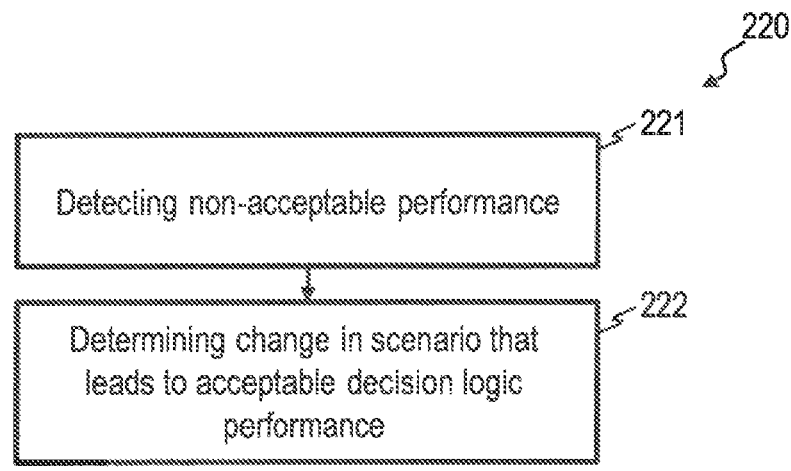
FIG. 24 is flow chart of a method.

FIG. 24 is a flow chart of a method 220. The method 220 may be performed automatically by the supervisory system 20 during field operation.

At step 221, a system state of the electric power system or of the industrial system is detected which causes the decision-making logic 35 to not meet a performance-metric based criterion (e.g., to have a performance determined according to the performance metric that exceeds a threshold).

At step 222, one or several system parameters that would have to be changed to cause the decision-making logic 35 to meet a performance-metric based criterion (e.g., to have a performance determined according to the performance metric that exceeds a threshold) are automatically identified by the supervisory system. The information on which system parameter(s) would have to be changed to ensure compliance with the performance-metric based criterion is output.

Figure 25:
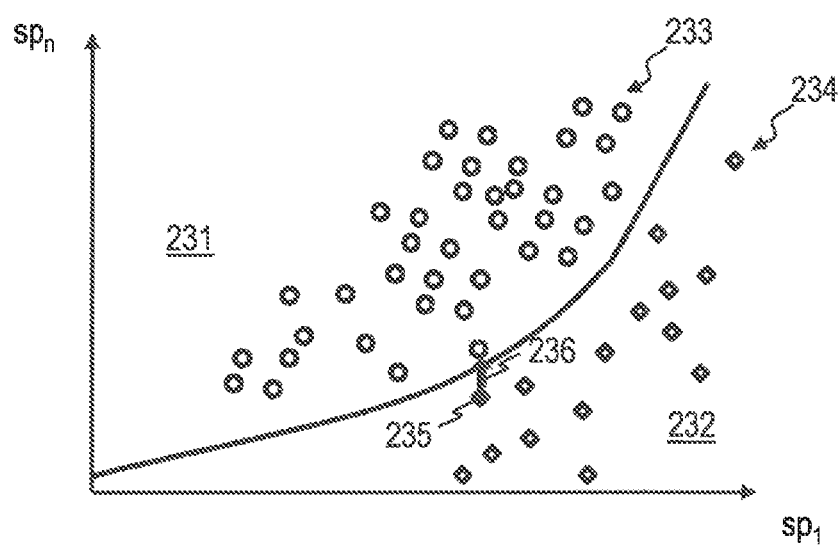
FIG. 25 is a diagram showing a scenario parameter space.

FIG. 25 schematically illustrates a state space spanned by plural system parameters $sp_1, \ldots, sp_n, \ldots sp_M$. The parameters $sp_1, \ldots, sp_n, \ldots sp_M$ are observables that may be received and processed by the performance-assessment logic 27 or more generally by the supervisory system 20.

The parameter space is subdivided into an acceptable scenario space 231 and an unacceptable scenario space 232. All combinations of scenario signatures 233 which result in a well-performing decision-making logic 35 are arranged in the acceptable scenario space 231. All combinations of scenario signatures 234 which result in a poorly performing decision-making logic 35 are arranged in the unacceptable scenario space 232.

These spaces 231, 232 are dependent on the used performance metrics and a threshold to which the computed performance of the decision-making logic 35 is compared.

When a scenario signature 235 in the unacceptable-scenario space 232 is identified, a procedure for identifying a potential root cause of the underperformance of the decision-making logic 35 may be automatically triggered. Alternatively, the procedure may be triggered selectively only if the performance is computed to be below a first threshold, but still above a second threshold.

The supervisory system 20 may be operative to identify a minimal modification 236 to the current scenario signature 235 which would result in a modified scenario signature located within the space 231 of acceptable scenarios. That is, the supervisory system 20 may be operative to identify a minimal modification of scenario signatures that will qualify such scenario signatures to be classified within the acceptable scenario space.

This may be done in various ways. For illustration, the supervisory system 20 may be operative to solve a constrained optimization problem to identify the minimum modification 236 to the current scenario signature 235 that results in acceptable performance of the decision-making logic. When the performance assessment logic 27 is deployed, it can be used to evaluate the effect of shift(s) 236 in scenario signature that are explored in the constrained optimization routine.

The supervisory system 20 may use the distance, determined in accordance with a norm, $$\left\| \begin{pmatrix} \widetilde{sp}_1 \\ \widetilde{sp}_2 \\ \vdots \end{pmatrix} - \begin{pmatrix} sp_1 \\ sp_2 \\ \vdots \end{pmatrix} \right\| \quad (3)$$

between the current scenario signature $(sp_1, sp_2, \cdots)$ and a hypothetical modified scenario signature $(\widetilde{sp}_1, \widetilde{sp}_2, \cdots)$ as an objective function that is to be minimized.

The supervisory system 20 may minimize the objective function (3) under the constraint that the performance $$p(\widetilde{sp}_1, \widetilde{sp}_2, \cdots) \quad (4)$$

determined at the modified scenario signature $(\widetilde{sp}_1, \widetilde{sp}_2, \cdots)$ has a value that meets the performance-metric based criterion, i.e., that the modified scenario signature $(\widetilde{sp}_1, \widetilde{sp}_2, \cdots)$ lies within the acceptable scenario space 231.

Figure 26:
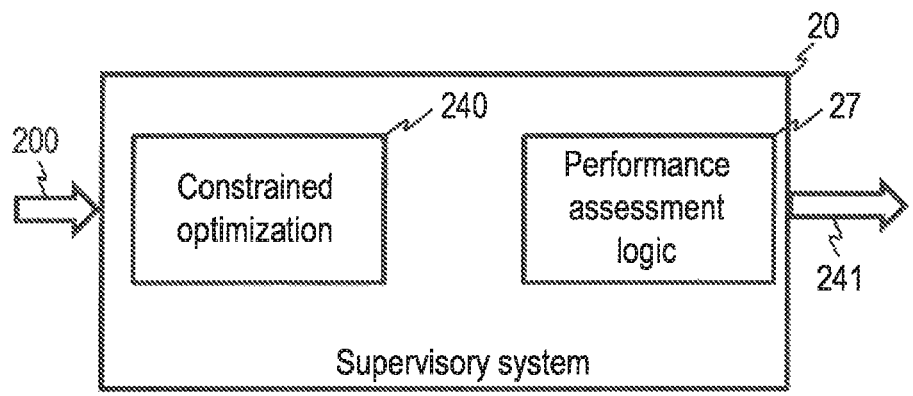
FIG. 26 is a diagram illustrating operation of a supervisory system.

FIG. 26 is a schematic block diagram of the supervisory system 20, which combines the performance assessment logic with a constrained optimization engine 240. The constrained optimization engine 240 searches for a modified point in parameter space that is as close as possible to the actual system state currently observed during field operation of the controller 31, while resulting in a performance of the decision-making logic 35 determined by the performance assessment logic 27 that is considered to be acceptable.

The supervisory system 20 generates an output 241, which may indicate which system parameter(s) would have to be changed to ensure that the decision-making logic 35 has a performance as determined by the performance assessment logic 27 that is considered to be acceptable. The output 241 may be an output provided via an HMI to a human expert. Alternatively or additionally, a control action may be automatically taken or suggested that corresponds to the shift in system parameter determined by the supervisory system 20.

Some of the differences between the quantities in the scenario signatures will be zero which implies no impact, some will be small which implies minimum impact, and some will be large, which implies considerable impact. This can provide insights on what changes in the environment are affecting the controller's suitability/performance as assessed by the supervisory system 20.

The constrained optimization engine 240 may use various techniques. In essence, solving the constrained optimization is a parameter search problem. The constrained optimization engine 240 may use a trial-and-error search, which is available without requiring any analytical information (such as gradients) to guide the search of the parameter space. Established trial-and-error search methods include evolutionary and genetic algorithms, hill-climbing, simulated annealing, and other heuristics.

The constrained optimization engine 240 may perform a model-based search which estimates the expected performance of a choice of parameters, thus bypassing the need to simulate (batch of) scenario(s) in order to compute the performance metric. In the present case, the model can be identified previously from several simulations of batches of scenarios, which were used when generating the performance assessment logic 27.

Another way of tackling the identification of a root-cause as to why the current system state of the electric power system or industrial system problem results in the decision-making logic 35 to be underperforming can use a sensitivity analysis. For illustration, the supervisory system 20 may utilize the sensitivity of the output of the performance assessment logic 27 to its input. This is a conditional sensitivity, i.e. the sensitivity of a given observed outcome (the one that denoted unsuitability of the controller) to the given specific input. In that way, the supervisory system 20 can report to the human expert the scenario signatures to which the actually determined output of the performance assessment logic 27 is most sensitive.

Figure 27:
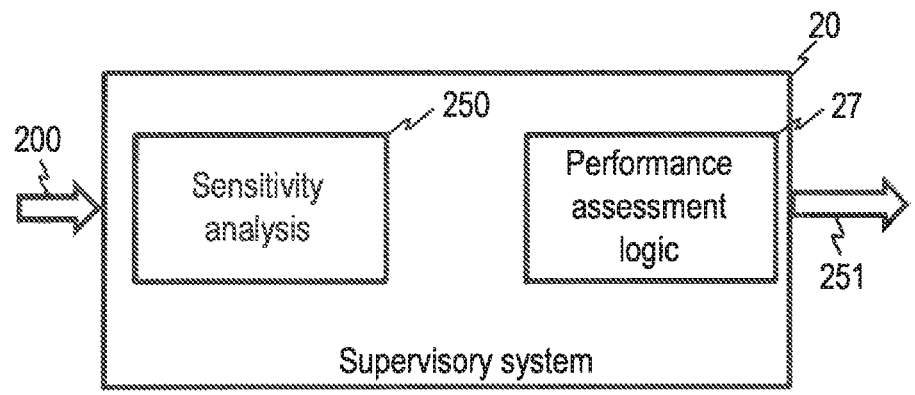
FIG. 27 is a diagram illustrating operation of a supervisory system.

FIG. 27 is a schematic block diagram of the supervisory system 20, which combines the performance assessment logic 27 with a sensitivity analysis engine 250. The sensitivity analysis engine 250 may determine a sensitivity of the output of the performance assessment logic 27 to its input, in response to modifications in the various parameters included in the input. The output 251 of the supervisory system 20 may indicate the scenario signatures to which the actually determined output of the performance assessment logic 27 is most sensitive.

The methods, devices, and systems according to the invention allow a decision-making logic to be automatically monitored during field operation. The disclosed techniques remain operative even when the decision-making logic is a trained ML model that behaves as a black box towards the technical expert.

The methods, devices, and systems can be used for concurrently monitoring separate decision-making logics deployed in an industrial system, such as an electric power generation, transmission or distribution system. In that case, a dedicated performance assessment logic may be generated and deployed for any decision-making logic in the field.

The methods, devices, and systems according to the invention are capable of identifying scenarios that would cause the decision-making logic to perform not in accordance with a performance-metric based quality criterion.

As used herein, a "scenario" generally encompasses a set of operating conditions and events faced by the decision-making logic, such as generation, demand and weather patterns, faults (i.e. short-circuits), planned outages, topology configurations, addition of new components, evolution of demand, storage and renewable generation.

The decision-making logic may be a control logic (e.g., a protection logic, such as a distance protection logic), without being limited thereto.

The methods, devices, and systems according to the invention may be used for assessing whether any one of the following logics are capable of operating in accordance with a desired performance criterion, without being limited thereto:

protection system, as well as SIPS (system integrity protection schemes),
local FACTS/HVDC controller,
coordinated control of many devices throughout the grid (such as FACTS, HVDC, generators active demand, storage),
control of DER (directly, or via aggregator or distribution system operators),
distributed control in grids,
control logic which allows to relax grid operation limits, in various look-ahead time horizons (the control logic can include pre- and post-disturbance control actions)
logic for scheduling asset maintenance/replacement,
logic for power system restoration,
logic to propose power systems upgrades and expansion.

While embodiments have been described in the context of electric power systems, the methods and computer systems are not limited to generating and/or using the decision-making logic of a protection relay of a power generation, distribution, or transmission system. Rather, the disclosed methods and computer systems may be used to generate the decision-making logic of a controller or of several controllers of an IACS.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of monitoring performance of a decision-making logic of a controller of an electric power system, during field operation of the controller, the decision-making logic configured to determine an action to take in order to protect the electric power system, the method comprising:

during a design phase and prior to field operation, generating pre-operational data of the controller and/or a performance assessment logic, the performance assessment logic being generated using data generated in a computer-implemented process of creating the decision-making logic;

during a field operation phase that is subsequent to the design phase, receiving operational data collected during field operation of the controller, and performing an analysis of the operational data to determine whether a current performance of the decision-making logic, during the field operation, has deteriorated relative to a prior performance of the decision-making logic during simulations in the design phase, using the pre-operational data and/or the performance assessment logic; and when determining that the current performance of the decision-making logic has deteriorated relative to the prior performance, initiating a redesign phase comprising an autonomous redesign and training of the decision-making logic using a different set of scenarios than were used during the simulations in the design phase.

2. The method of claim 1, wherein the analysis uses pre-operational data generated prior to field operation of the controller that includes performance of the decision-making logic in simulations performed when generating the decision-making logic and/or that includes scenarios, test cases, and/or events that were simulated when generating the decision-making logic, wherein performing the analysis comprises comparing control actions taken by the controller during field operation and control actions simulated when generating the decision-making logic, and/or comparing operating points observed during field operation of the controller with operating points resulting from the scenarios, test cases, and/or events that were simulated when generating the decision-making logic.

3. The method of claim 1, wherein the analysis uses a performance assessment logic that receives, as inputs, the operational data and/or predictions for future operation points from predictors that receive the operational data as inputs, the performance assessment logic being generated using data generated in a computer-implemented process of creating the decision-making logic, wherein the performance assessment logic is a machine learning model that is trained with a second set of scenarios different from a first set of scenarios used to train the decision-making logic.

4. The method of claim 1, wherein the method further comprises controlling a human machine interface, HMI, to output the analysis output and/or automatically performing a control action based on the analysis output that comprises feeding the analysis output back to a generation system for generating the decision-making logic.

5. The method of claim 1, wherein performing the analysis comprises computing one or several key performance indicators, KPIs, in accordance with at least one metric, optionally wherein the at least one metric is dependent on a user input.

6. The method of claim 1, wherein the operational data further comprise electric power system data that affects operation of the controller, optionally wherein the electric power system data comprises at least one of the following:
- data at a bus to which the controller is connected,
- data from a bus different from the bus to which the controller is connected,
- data from system-wide measurements,
- data from an energy management system, EMS,
- data from a distribution management system, DMS.

7. The method of claim 1, wherein the analysis is performed using the pre-operational data and the method further comprises retrieving the pre-operational data from a database during field operation of the controller.

8. The method of claim 7, wherein the pre-operational data comprises at least one of the following:
- models used to perform simulations when generating the decision-making logic,
- scenarios, test cases, and/or events that were simulated when generating the decision-making logic,
- performance of the decision-making logic in simulations performed when generating the decision-making logic.

9. The method of claim 8, wherein performing the analysis comprises at least one of the following:
- evaluating an accuracy of the models used to perform simulations when generating the decision-making logic, optionally including model validation, calibration and/or identification during field operation of the controller and/or comparing signals observed during field operation of the controller with signals expected according to the models used to perform simulations when generating the decision-making logic;
- evaluating the scenarios, test cases, and/or events that were simulated when generating the decision-making logic, optionally including comparing operating points observed during field operation of the controller with operating points resulting from the scenarios, test cases, and/or events that were simulated when generating the decision-making logic;
- comparing control actions taken by the controller during field operation and control actions simulated when generating the decision-making logic, optionally including creating a dataset including system operating conditions and control actions taken by the controller during field operation of the controller and comparing the dataset to the pre-operational data including system operating conditions and resultant control actions simulated when generating the decision-making logic;
- comparing a value of at least one key performance indicator, KPI, for decision outputs taken by the controller during field operation and a value of the at least one KPI stored in the pre-operational data.

10. The method of claim 1, wherein the analysis is performed using the performance assessment logic, wherein the performance assessment logic is a machine learning model, optionally wherein the performance assessment logic is an artificial neural network.

11. The method of claim 10, wherein the machine learning model is trained prior to field operation of the controller and after the decision-making logic has been generated, using data generated during generation of the decision-making logic.

12. The method of claim 10, further comprising training the machine learning model with a second set of scenarios, wherein
- the second set of scenarios includes scenarios that are outside of an operation specification of the controller, and/or
- the second set of scenarios is different from a first set of scenarios used to train the decision-making logic;

optionally further comprising:
- generating at least a sub-set of the first set of scenarios with a scenario-creating logic, optionally wherein the scenario-creating logic comprises a further machine learning model, further optionally wherein the scenario-creating logic is a discriminator of a generative adversarial network.

13. The method of claim 1, further comprising:
monitoring or predicting a time-dependent evolution of results of the analysis and generating the analysis output based on the time-dependent evolution, optionally wherein
- predicting the time-dependent evolution comprises predicting future operating points, and/or
- an alarm, warning, or other analysis output is automatically generated if the time-dependent evolution is indicative of a future controller performance that does not meet a performance-metric based criterion.

14. The method of claim 1, further comprising:
identifying a root-cause for poor performance of the decision-making logic during field operation and/or performing a root-cause resolution for improving the decision-making logic during field operation,
optionally comprising identifying, by a supervisory system performing the field operation phase, a shift in a scenario parameter space that causes the performance of the decision-making logic to fulfill a performance-metric based criterion;
further optionally wherein identifying the shift in the scenario parameter space comprises performing a constrained optimization, optionally using the performance assessment logic to enforce a constraint.

15. The method of claim 1, further comprising:
controlling a human machine interface, HMI, to output the analysis output, wherein the analysis output includes information on a past, current, and/or predicted future performance of the controller during field operation.

16. A method of operating a power system asset of a power system, comprising:
executing, by at least one controller, a decision-making logic during field operation of the controller, including generating and outputting decision outputs to control the power system asset;
executing, by the at least one integrated circuit of the controller or by at least one further integrated circuit, the method of claim 1 for monitoring the decision-making logic of the controller during field operation of the controller.

17. The method according to claim 16, wherein the method comprises,
outputting the analysis output via a human machine interface, HMI, and/or automatically performing a control action based on the analysis output, optionally wherein the control action triggers a re-generation or update of the decision-making logic.

18. A supervisory system for a decision-making logic of a controller of an industrial automation control system, IACS, in particular of a controller of an electric power system, during field operation of the controller, the supervisory system comprising:
at least one integrated circuit operative to perform the field operation phase in the method of claim 1.

19. An Industrial Automation Control System, IACS, in particular an electric power system, comprising:
- a controller operative to execute a decision-making logic to decide which control actions must be taken; and
- the supervisory system of claim 18 for monitoring the decision-making logic during its operation.

\* \* \* \* \*